(12) United States Patent
Henry et al.

(10) Patent No.: US 11,737,383 B2
(45) Date of Patent: Aug. 29, 2023

(54) SYSTEMS AND METHODS FOR SOIL CLOD DETECTION

(71) Applicant: CNH Industrial Canada, Ltd., Saskatoon (CA)

(72) Inventors: James W. Henry, Saskatoon (CA); Christopher Nicholas Warwick, Hertfordshire (GB)

(73) Assignee: CNH Industrial Canada, Ltd., Saskatoon (CA)

( * ) Notice: Subject to any disclaimer, the term of this patent is extended or adjusted under 35 U.S.C. 154(b) by 240 days.

(21) Appl. No.: 17/175,138

(22) Filed: Feb. 12, 2021

(65) Prior Publication Data
US 2022/0256759 A1  Aug. 18, 2022

(51) Int. Cl.
*A01B 27/00* (2006.01)
*G06V 10/50* (2022.01)
(Continued)

(52) U.S. Cl.
CPC ............ *A01B 27/005* (2013.01); *A01B 76/00* (2013.01); *A01B 79/005* (2013.01);
(Continued)

(58) Field of Classification Search
CPC ..... A01B 27/005; A01B 76/00; A01B 79/005; G06T 7/0002; G06T 7/13; G06V 10/50;
(Continued)

(56) References Cited

U.S. PATENT DOCUMENTS 6,608,672 B1   8/2003  Shibusawa et al.
10,916,028 B1  2/2021  Barrick
(Continued)

FOREIGN PATENT DOCUMENTS

WO   WO 2019/070617      4/2019
WO   WO 2021/021795 A1   2/2021

OTHER PUBLICATIONS

Taconet, O. et al., "A contour-based approach for clods identification and characterization on a soil surface," Soil and Tillage Research, Elsevier, Amsterdam, NL, vol. 109, No. 2, Aug. 1, 2010, pp. 123-132, XP027151304, ISSN 0167-1987.
(Continued)

*Primary Examiner* — Ayodeji O Ayotunde
(74) *Attorney, Agent, or Firm* — Rebecca Henkel; Rickard DeMille

(57) ABSTRACT

In one aspect, a method for determining soil clods within a field includes receiving one or more images depicting an imaged portion of an agricultural field. The method also includes classifying a portion of the plurality of pixels that are associated with soil within the imaged portion of the field as soil pixels with each soil pixel being associated with a respective pixel height. The method also includes generating a first ray from a local maximum in a first direction and a second ray from the local maximum in a second direction that is perpendicular to the first ray until opposing endpoints are determined based on a detected edge condition. Lastly, the method includes determining whether a soil clod based at least in part the first ray or the second ray of the candidate soil clod.

19 Claims, 12 Drawing Sheets

(51) Int. Cl.
*G06V 20/56* (2022.01)
*A01B 76/00* (2006.01)
*A01B 79/00* (2006.01)
*G06T 7/00* (2017.01)

(52) U.S. Cl.
CPC ............ *G06T 7/0002* (2013.01); *G06V 10/50* (2022.01); *G06V 20/56* (2022.01); *G06T 2207/30188* (2013.01)

(58) Field of Classification Search
CPC ........ G06V 20/56; G06V 10/44; G06V 10/54; G06V 20/188
USPC ........................................................ 382/110
See application file for complete search history.

(56) References Cited

U.S. PATENT DOCUMENTS

| | | | |
|---|---|---|---|
| 2006/0164417 A1* | 7/2006 | Donovan | G06T 17/05 345/428 |
| 2018/0174291 A1 | 6/2018 | Asada et al. | |
| 2018/0206393 A1 | 7/2018 | Stoller et al. | |
| 2019/0377986 A1 | 12/2019 | Ferrari et al. | |
| 2019/0387658 A1 | 12/2019 | Henry | |
| 2020/0005474 A1 | 1/2020 | Ferrari et al. | |
| 2020/0037491 A1 | 2/2020 | Schoeny et al. | |
| 2020/0073389 A1* | 3/2020 | Flajolet | G06V 10/82 |

OTHER PUBLICATIONS

Extended European Search Report in corresponding EP Application No. 22156167, dated Jul. 20, 2022 (7 pages).
Marinello et al., "Three-Dimensional Sensor for Dynamic Characterization of Soil Microrelief", Precision Agriculture '13, Dated Jul. 2013, (13 pages) https://www.researchgate.net/profile/Giuliano_Mosca/publication/259183204_Understanding_the_effects_Of_sitespecific_fertilization_on_yield_and_protein_content_in_durum_wheat/links/566fd87e08ae4d9a4258b9e0.pdf#page=72.
Riegler-Nurscher et al., "Machine Vision for Soil Roughness Measurement and Control of Tillage Machines During Seedbed Preparation", Soil & Tillage Research, Dated Feb. 2020 (9 pages) https://www.sciencedirect.com/science/article/pii/S0167198719300613 (via "Download PDF" link).
Mirzaei et al., "Monitoring of Soil-roughness Caused by Rainfall Using Stereo-photogrammetry", International Research Journal of Applied and Basic Sciences, vol. 3, Dated 2012, (18 pages) https://www.researchgate.net/profile/Stephane_Ruy/publication/265026574_Monitoring_of_soilroughness_caused_by_rainfall_using_stereophotogrammetry/links/5440b8cc0cf21227a11bb581.pdf.

* cited by examiner

US 11,737,383 B2

SYSTEMS AND METHODS FOR SOIL CLOD DETECTION

FIELD OF THE INVENTION

The present subject matter relates generally to the acquisition and analysis of surface condition data associated with an agricultural field and, more particularly, to systems and methods for detecting soil clods within a field.

BACKGROUND OF THE INVENTION

Soil roughness generally refers to the roughness of soil in a field. Soil roughness is a product of or otherwise influenced by the number and size of soil clods included within the soil. Soil clods refer to portions of the soil that are denser than the surrounding soil, thereby forming a separate clod. For various reasons, it is important to maintain a given amount of soil roughness within a field before or following an agricultural operation. For example, when planting seeds it is generally not desired to have soil clods that are larger than a certain size.

As such, the ability to monitor and/or adjust the amount of soil roughness within a field can be very important to maintaining a healthy, productive field, particularly when it comes to performing tillage and/or planting operations. However, typical soil analysis may be time consuming, expensive, and data intensive. Accordingly, a system and method for detecting soil clods within a field would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for determining soil clods within a field. The method includes receiving, with a computing system, one or more images depicting an imaged portion of an agricultural field, the imaged portion of the field being at least partially represented by a plurality of pixels within the one or more images. The method further includes classifying, with the computing system, a portion of the plurality of pixels that are associated with soil within the imaged portion of the field as soil pixels with each soil pixel being associated with a respective pixel height. The method also includes identifying, with the computing system, a local maximum as a location of a candidate soil clod based on the pixel heights of the soil pixels. Further, the method includes generating, with the computing system, a first ray extending from the local maximum in a first direction until opposing endpoints are determined based on a detected edge condition. In addition, the method includes generating, with the computing system, a second ray from the local maximum in a second direction that is perpendicular to the first ray until opposing endpoints are determined based on a detected edge condition. Lastly, the method includes determining, with the computing system, whether a soil clod is present within the imaged portion of the field based at least in part on the first ray and the second ray of the candidate soil clod.

In another aspect, the present subject matter is directed to a system for determining one or more soil clods within a field. The system includes an imaging device configured to capture one or more images depicting an imaged portion of the field with the imaged portion of the field being at least partially represented by a plurality of pixels within the one or more images. The system further includes a computing system communicatively coupled to the imaging device. The computing system includes a processor and associated memory with the memory storing instructions that, when implemented by the processor, configure the computing system to receive the one or more images from the imaging devices, classify a portion of the plurality of pixels that are associated with soil within the imaged portion of the field as soil pixels, determine one or more local maximum based on the pixel heights of the soil pixels, identify each of the one or more local maximum as a location of a candidate soil clod, generate a first ray and a second ray extending in perpendicular directions from one another, with at least one of the first ray or the second ray intersecting the local maximum, and generate a boundary of the soil clod based on a length of the first ray and a length of the second ray.

In another aspect, the present subject matter is directed to a method for determining soil clods within a field. The method includes receiving, with a computing system, one or more images depicting a first imaged portion of an agricultural field. The first imaged portion of the field is at least partially represented by a plurality of pixels within the one or more images. The method also includes classifying, with the computing system, a portion of the plurality of pixels that are associated with soil within the first imaged portion of the field as soil pixels with each soil pixel being associated with a respective pixel height. Further, the method includes generating a first ray and a second ray extending in perpendicular directions from one another from each local maximum within the soil pixels of the first imaged portion with at least one of the first ray or the second ray intersecting the local maximum. Lastly, the method includes determining, with the computing system, whether a soil clod is present within the imaged portion of the field based at least in part on a soil clod ratio of a length of the first ray to a length of the second ray.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
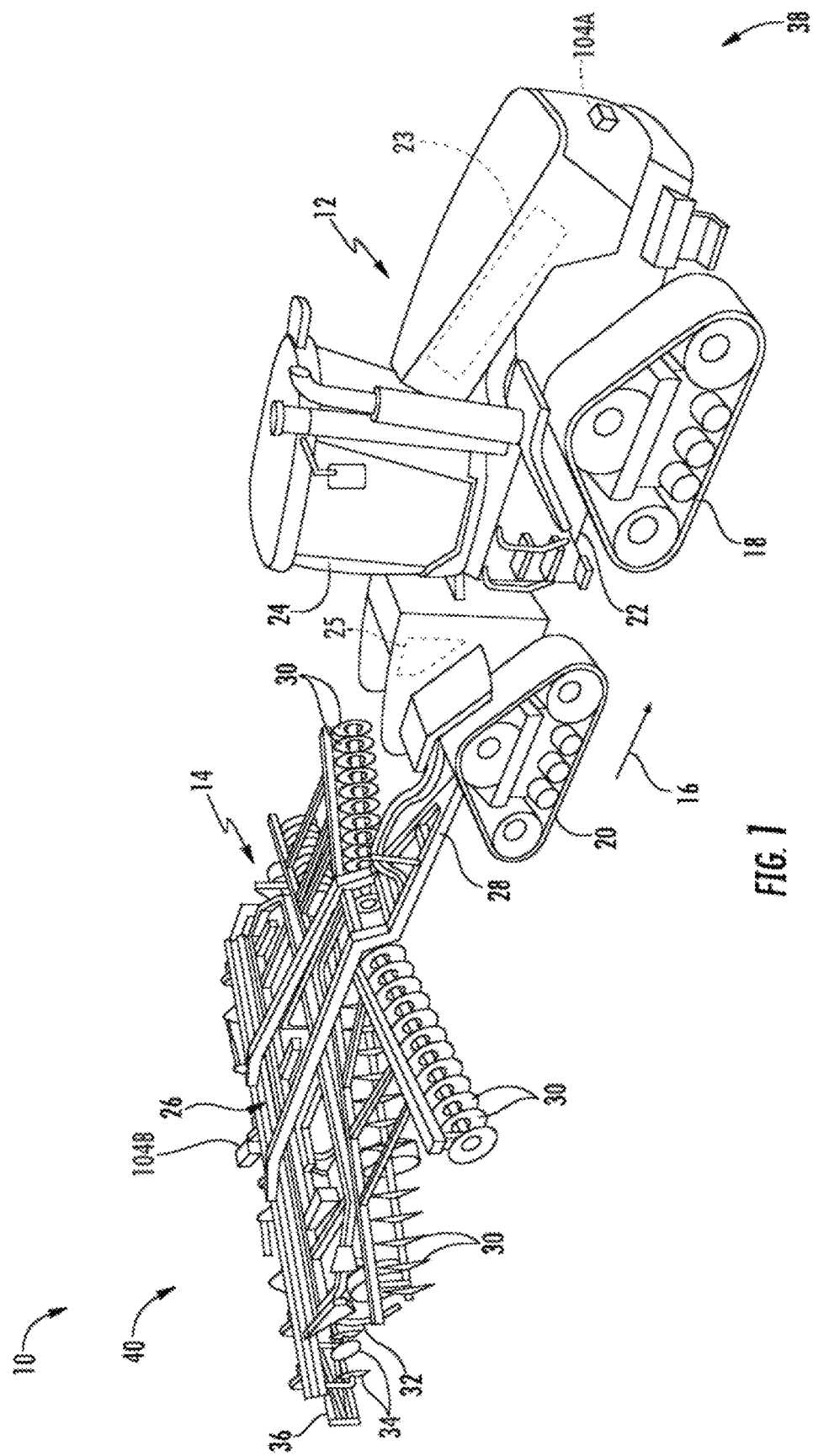
FIG. 1 illustrates a perspective view of an agricultural machine in accordance with aspects of the present subject matter, particularly illustrating the agricultural machine including imaging devices for capturing images of a field across which the machine is being traversed.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In general, the present subject matter is directed to systems and methods for detecting soil clods within an agricultural field. As will be described below, a soil clod is generally characterized by a portion of soil that is denser than the surrounding soil, thereby forming a separate clod or other object that extends above a nominal height of the soil surface or other reference point or plane by a given height. Such soil clods can result in an undesirable circumstances that can impact subsequent agricultural operations within the field (e.g., a subsequent planting operation). For example, when planting seeds, it is generally not desired to have soil clods that are larger than a certain size.

In accordance with aspects of the present subject matter, the disclosed systems and methods utilize computer vision techniques and/or image processing algorithms to detect soil clods within imaged portions of an agricultural field. Specifically, in several embodiments, one or more imaging devices (e.g., a stereo camera assembly) are used to capture images of the field that: (1) allow the pixels within each image to be classified as residue or soil; and (2) provide depth information associated with the distance from the imaging device(s) to imaged surface features of the field (e.g., the soil surface, residue, etc.), which can then be translated to a height of such features above a given reference plane (e.g., a reference plane approximating the soil surface). By obtaining such depth information, the pixels classified as soil can be evaluated to determine whether a soil clod is present within the imaged portion of the field.

Referring now to drawings, FIG. 1 illustrates a perspective view of an agricultural machine 10 in accordance with various aspects of the present subject matter. As shown, in the illustrated embodiment, the agricultural machine 10 includes a work vehicle 12 and an associated agricultural implement 14. In general, the work vehicle 12 is configured to tow the implement 14 across a field in a direction of travel (e.g., as indicated by arrow 16 in FIG. 1). In the illustrated embodiment, the work vehicle 12 is configured as an agricultural tractor and the implement 14 is configured as an associated tillage implement. However, in other embodiments, the work vehicle 12 may be configured as any other suitable type of vehicle, such as an agricultural harvester, a self-propelled sprayer, and/or the like. Similarly, the implement 14 may be configured as any other suitable type of implement, such as a planter. Furthermore, it will be appreciated that the agricultural machine 10 may correspond to any suitable powered and/or unpowered agricultural machine (including suitable vehicles and/or equipment, such as only a work vehicle or only an implement). Additionally, the agricultural machine 10 may include two or more associated vehicles, implements, and/or the like (e.g., a tractor, a planter, and an associated air cart).

As shown in FIG. 1, the work vehicle 12 includes a pair of front track assemblies 18, a pair or rear track assemblies 20, and a frame or chassis 22 coupled to and supported by the track assemblies 18, 20. An operator's cab 24 may be supported by a portion of the chassis 22 and may house various input devices for permitting an operator to control the operation of one or more components of the work vehicle 12 and/or one or more components of the implement 14. Additionally, as is generally understood, the work vehicle 12 may include an engine 23 and a transmission 25 mounted on the chassis 22. The transmission 25 may be operably coupled to the engine 23 and may provide variably adjusted gear ratios for transferring engine power to the track assemblies 18, 20 via a drive axle assembly (not shown) (or via axles if multiple drive axles are employed).

Additionally, as shown in FIG. 1, the implement 14 may generally include a carriage frame assembly 26 configured to be towed by the work vehicle 12 via a pull hitch or tow bar 28 in the direction of travel 16 of the vehicle 12. As is generally understood, the carriage frame assembly 26 may be configured to support a plurality of ground-engaging tools, such as a plurality of shanks, disk blades, leveling blades, basket assemblies, tines, spikes, and/or the like. For example, in the illustrated embodiment, the carriage frame assembly 26 is configured to support various gangs of disc blades 30, a plurality of ground engaging shanks 32, a plurality of leveling blades 34, and a plurality of crumbler wheels or basket assemblies 36. However, in alternative embodiments, the carriage frame assembly 26 may be configured to support any other suitable ground engaging tools and/or combination of ground engaging tools. In several embodiments, the various ground-engaging tools may be configured to perform a tillage operation or any other suitable ground-engaging operation across the field along which the implement 14 is being towed. It should be understood that, in addition to being towed by the work vehicle 12, the implement 14 may also be a semi-mounted implement connected to the work vehicle 12 via a two-point hitch (not shown) or the implement 14 may be a fully mounted implement (e.g., mounted the work vehicle's 12 three-point hitch (not shown)).

It will be appreciated that the configuration of the agricultural machine 10 described above and shown in FIG. 1 is provided only to place the present subject matter in an exemplary field of use. Thus, it will be appreciated that the present subject matter may be readily adaptable to any manner of machine configuration, including any suitable work vehicle configuration and/or implement configuration. For example, in an alternative embodiment of the work vehicle 12, a separate frame or chassis may be provided to which the engine, transmission, and drive axle assembly are coupled, a configuration common in smaller tractors. Still other configurations may use an articulated chassis to steer the work vehicle 10 or rely on tires/wheels in lieu of the track assemblies 18, 20. Similarly, as indicated above, the carriage frame assembly 26 of the implement 14 may be configured to support any other suitable combination of type of ground-engaging tools.

Furthermore, in accordance with aspects of the present subject matter, the agricultural machine 10 may include one or more imaging devices 104 coupled thereto and/or supported thereon. Each imaging device(s) 104 may, for example, be configured to capture images or other data relating to one or more conditions of the field along which the machine 10 is being traversed. Specifically, in several embodiments, the imaging device(s) 104 may be used to collect data associated with one or more surface conditions of the field, such as one or more conditions relating to crop residue, soil clods, and/or surface irregularities (e.g., ridges and/or valleys) within the field. For instance, as will be described below, the imaging device(s) may be used to collect data associated with the detection of soil clods within the field.

In several embodiments, the imaging device(s) 104 may be provided in operative association with the agricultural machine 10 such that the imaging device(s) 104 has a field of view directed towards a portion(s) of the field adjacent to the work vehicle 12 and/or the implement 14, such as a portion(s) of the field disposed in front of, behind, and/or along one or both of the sides of the work vehicle 12 and/or the implement 14. For example, as shown in FIG. 1, in some embodiments, an imaging device(s) 104A may be provided at a forward end portion 38 of the work vehicle 12 to allow the imaging device(s) 104A to capture images and related data of a section of the field disposed in front of the work vehicle 12. Such a forward-located imaging device(s) 104A may allow pre-tillage images of the field to be captured for monitoring or determining surface conditions of the field (e.g., soil clods) prior to the performance of a tillage operation. Similarly, as shown in FIG. 1, a second imaging device(s) 104B may be provided at or adjacent to an aft end portion 40 of the implement 14 to allow the imaging device(s) 104B to capture images and related data of a section of the field disposed behind the implement 14. Such an aft-located imaging device(s) 104B may allow post-tillage images of the field to be captured for monitoring or determining surface conditions of the field (e.g., soil clods) after the performance of a tillage operation.

It will be appreciated that, in alternative embodiments, the imaging device(s) 104 may be installed at any other suitable location(s) on the work vehicle 12 and/or the implement 14. In addition, it will be appreciated that, in other embodiments, the agricultural machine 10 may only include a single imaging device(s) 104 mounted on either the work vehicle 12 or the implement 14 or may include more than two imaging device(s) 104 mounted on the work vehicle 12 and/or the implement 14. Moreover, it will be appreciated that each imaging device(s) 104 may be configured to be mounted or otherwise supported relative to a portion of the agricultural machine 10 using any suitable mounting/support structure. For instance, in some embodiments, each imaging device(s) 104 may be directly or indirectly mounted to a portion of the work vehicle 12 and/or the implement 14. In some embodiments, suitable mounting structure (e.g., mounting arms, brackets, trays, etc.) may be used to support each imaging device(s) 104 out in front of the vehicle 12 or behind the implement 14 (e.g., in a cantilevered arrangement) to allow the imaging device(s) 104 to obtain the desired field of view, including the desired orientation of the device's field of view relative to the field (e.g., a straight-down view oriented generally perpendicular to the surface of the field).

In general, the imaging device(s) 104 may correspond to any suitable device(s) or other assembly configured to capture images of the field. For instance, in several embodiments, the imaging device(s) 104 may correspond to a stereo camera assembly having first and second cameras 106, 108 (FIG. 2) incorporated therein or otherwise forming a part thereof. In such embodiments, the stereo camera assembly may be used to capture both two-dimensional and three-dimensional images of the field. Specifically, each camera may include a lens and a separate image sensor for capturing two-dimensional images. Additionally, by simultaneously capturing an image of the same portion of the field with each camera, the separate images can be combined, compared, and/or otherwise processed to extract three-dimensional information about such portion of the field. For example, by comparing the images captured by each camera, a depth image and/or a disparity image or map can be generated that allows the scene depth to be determined (e.g., relative to the camera) at each corresponding pixel location within the imaged portion of the field, which, in turn, can be converted into a scene height (or pixel height) at each corresponding pixel location relative to a reference plane (e.g., a reference plane approximating the soil surface). As a result, the relative height of specific features or points within the field may be determined, such as the relative height of soil within the field. It will be appreciated that, in addition to a stereo camera assembly or as an alternative thereto, the agricultural machine 10 may include any other suitable type of imaging device(s) 104. For instance, suitable imaging device(s) 104 may also include monocular cameras, single-spectrum cameras, multi-spectrum cameras and/or the like.

Figure 2:
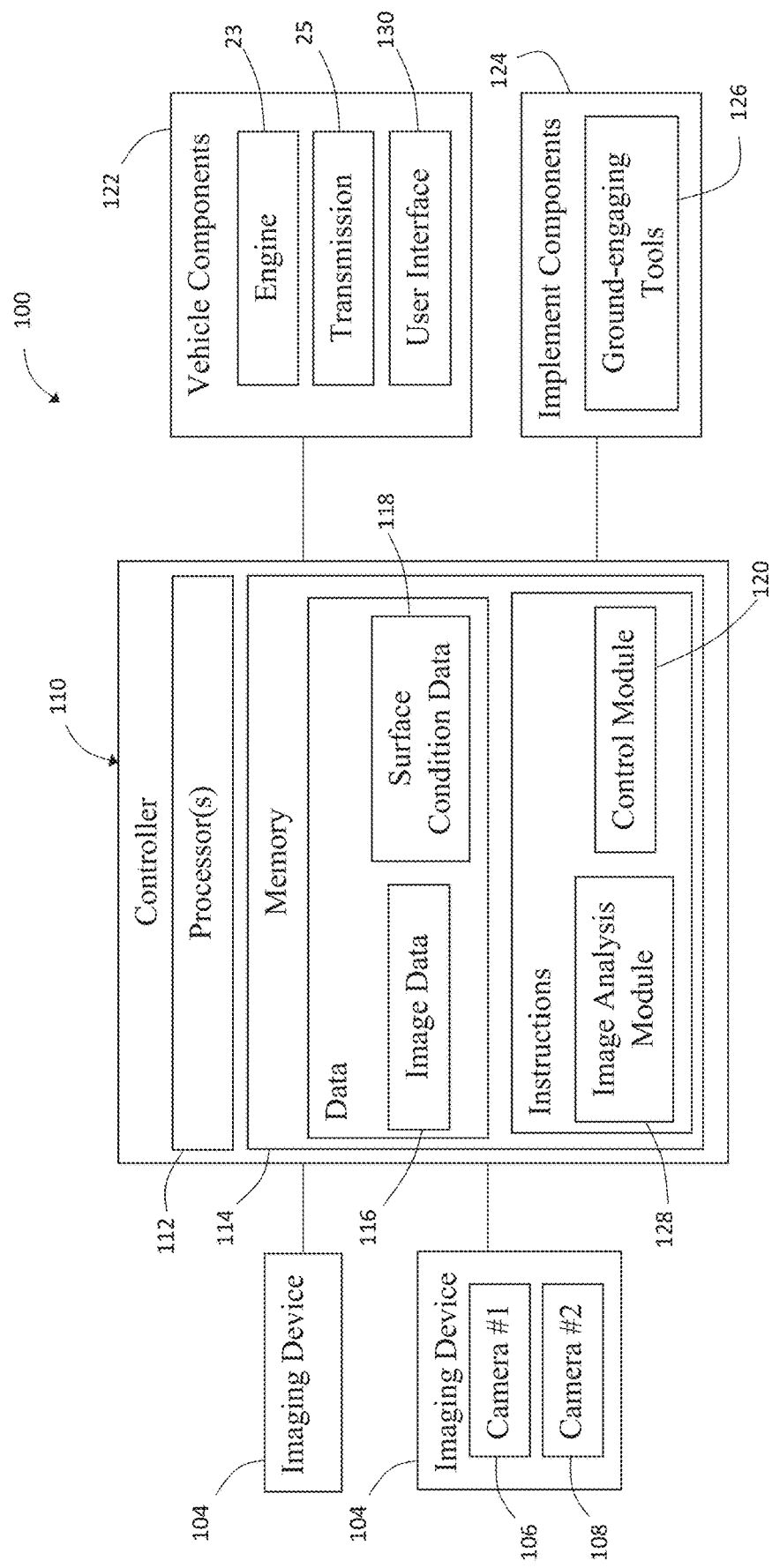
FIG. 2 illustrates a schematic view of a system for detecting soil clods within a field in accordance with aspects of the present subject matter.

Referring now to FIG. 2, a schematic view of a system 100 for monitoring one or more surface conditions associated with a field is illustrated in accordance with aspects of the present subject matter. Specifically, in several embodiments, the disclosed system 100 is configured for detecting soil clods within an agricultural field. The system 100 will generally be described herein with reference to the agricultural machine 10 described above with reference to FIG. 1. However, it will be appreciated by those of ordinary skill in the art that the disclosed system 100 may generally be utilized with agricultural machines having any other suitable machine configuration.

As shown in FIG. 2, the system 100 may include one or more imaging device(s) (e.g., the imaging devices 104 shown in FIG. 1) configured to capture images of a portion (s) of the field disposed adjacent to the work vehicle 12 and or the implement 14. As indicated above, in several embodiments, one or more of the imaging device(s) 104 may correspond to a stereo camera assembly including first and second cameras 106, 108 for capturing both two-dimensional and three-dimensional images of the field. Additionally, the system 100 may include or be associated with one or more components of the agricultural machine 10 described above with reference to FIG. 1, such as one or more components of the work vehicle 12 and/or the implement 14.

The system 100 may further include a computing system 110 communicatively coupled to the imaging device(s) 104. In several embodiments, the computing system 110 may be configured to receive and process the images captured by the imaging device(s) 104 to allow one or more surface conditions of the imaged portions of the field to be determined. For instance, the computing system 110 may be configured to execute one or more suitable image processing algorithms for detecting the presence of soil clods within the field.

In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the image processing algorithm(s) and/or related method(s) described below. In addition, the computing system 110 may also include various other suitable components, such as a communications circuit or module, one or more input/output channels, a data/control bus, and/or the like.

It will be appreciated that, in several embodiments, the computing system 110 may correspond to an existing controller of the agricultural machine 10 or the computing system 110 may correspond to a separate processing device. For instance, in some embodiments, the computing system 110 may form all or part of a separate plug-in module or computing device that is installed relative to the work vehicle 12 or implement 14 to allow for the disclosed system and method to be implemented without requiring additional software to be uploaded onto existing control devices of the work vehicle 12 or implement 14.

In several embodiments, the memory 114 of the computing system 110 may include one or more databases for storing information received and/or generated by the computing system 110. For instance, as shown in FIG. 2, the memory 114 may include an image database 116 storing data associated with the images captured by the imaging device (s) 104, including the images themselves and/or data deriving from the images (e.g., disparity maps, depth images generated based on the images captured by the imaging device(s) 104, convolutions of the depth images, etc.). Additionally, the memory 114 may include a surface condition database 118 storing data associated with the surface condition(s) being monitored by the computing system 110. For instance, as indicated above, the images and related data deriving from the imaging device(s) 104 may be used to detect the present soil clods within the field. In such instance, any related "soil clod" data generated by the computing system 110 may be stored within the surface condition database 118 for subsequent processing and/or analysis.

Moreover, as shown in FIG. 2, in several embodiments, the instructions stored within the memory 114 of the computing system 110 may be executed by the processor(s) 112 to implement an image analysis module 128. In general, the image analysis module 128 may be configured to process/analyze the images received from the imaging device(s) 104 and/or the data deriving therefrom to estimate or determine one or more surface conditions associated with the field. Specifically, in several embodiments, the image analysis module 128 may be configured to execute one or more image processing algorithms, such as the imaging processing algorithms described herein, to allow soil clods to be identified by the computing system 110. For example, in some embodiments, the memory 114 storing instructions may configure the computing system 110 to receive the one or more images from the imaging devices 104, classify a portion of the plurality of pixels that are associated with soil within the imaged portion of the field as soil pixels, each soil pixel being associated with a respective pixel height, determine one or more local maximum based on the pixel heights of the soil pixels, identify each of the one or more local maximum as a location of a candidate soil clod, generate a first ray and a second ray extending in perpendicular directions from one another, with at least one of the first ray or the second ray intersecting the local maximum, and/or generate a boundary of the soil clod based on the first and second rays.

Referring still to FIG. 2, in some embodiments, the instructions stored within the memory 114 of the computing system 110 may also be executed by the processor(s) 112 to implement a control module 120. In general, the control module 120 may be configured to electronically control the operation of one or more components of the agricultural machine 10. For instance, in several embodiments, the control module 120 may be configured to control the operation of the agricultural machine 10 based on the monitored surface condition(s) of the field. Such control may include controlling the operation of one or more components 122 of the work vehicle 12, such as the engine 23 and/or the transmission 25 of the vehicle 12 to automatically adjust the ground speed of the agricultural machine 10. In addition (or as an alternative thereto), the control module 120 may be configured to electronically control the operation of one or more components 124 of the implement 14. For instance, the control module 120 may be configured to adjust the operating parameters (e.g., penetration depth, down force/pressure, etc.) associated with one or more of the ground-engaging tools 126 of the implement 14 (e.g., the disc blades 30, shanks 32, leveling blades 34, and/or basket assemblies 36) to proactively or reactively adjust the operation of the implement 14 in view of the monitored surface condition(s).

In several embodiments, the computing system 110 may also be communicatively coupled to a user interface, such as a user interface 130 housed within the cab 24 of the work vehicle 12 or at any other suitable location. The user interface 130 may be configured to provide feedback to the operator of the agricultural machine 10. Thus, the user interface 130 may include one or more feedback devices (not shown), such as display screens, speakers, warning lights, and/or the like, which are configured to communicate such feedback. In addition, some embodiments of the user interface 130 may include one or more input devices (not shown), such as touchscreens, keypads, touchpads, knobs, buttons, sliders, switches, mice, microphones, and/or the like, which are configured to receive user inputs from the operator.

It will be appreciated that, although the various control functions and/or actions will generally be described herein as being executed by the computing system 110, one or more of such control functions/actions (or portions thereof) may be executed by a separate computing system or may be distributed across two or more computing systems (including, for example, the computing system 110 and a separate computing system). For instance, in some embodiments, the computing system 110 may be configured to acquire data from the imaging device(s) 104 for subsequent processing and/or analysis by a separate computing system (e.g., a computing system associated with a remote server). In other embodiments, the computing system 110 may be configured to execute the image analysis module 128 to determine and/or monitor one or more surface conditions within the field, while a separate computing system (e.g., a vehicle computing system associated with the agricultural machine 10) may be configured to execute the control module 120 to control the operation of the agricultural machine 10 based on data and/or instructions transmitted from the computing system 110 that are associated with the monitored surface condition(s).

Figure 3:
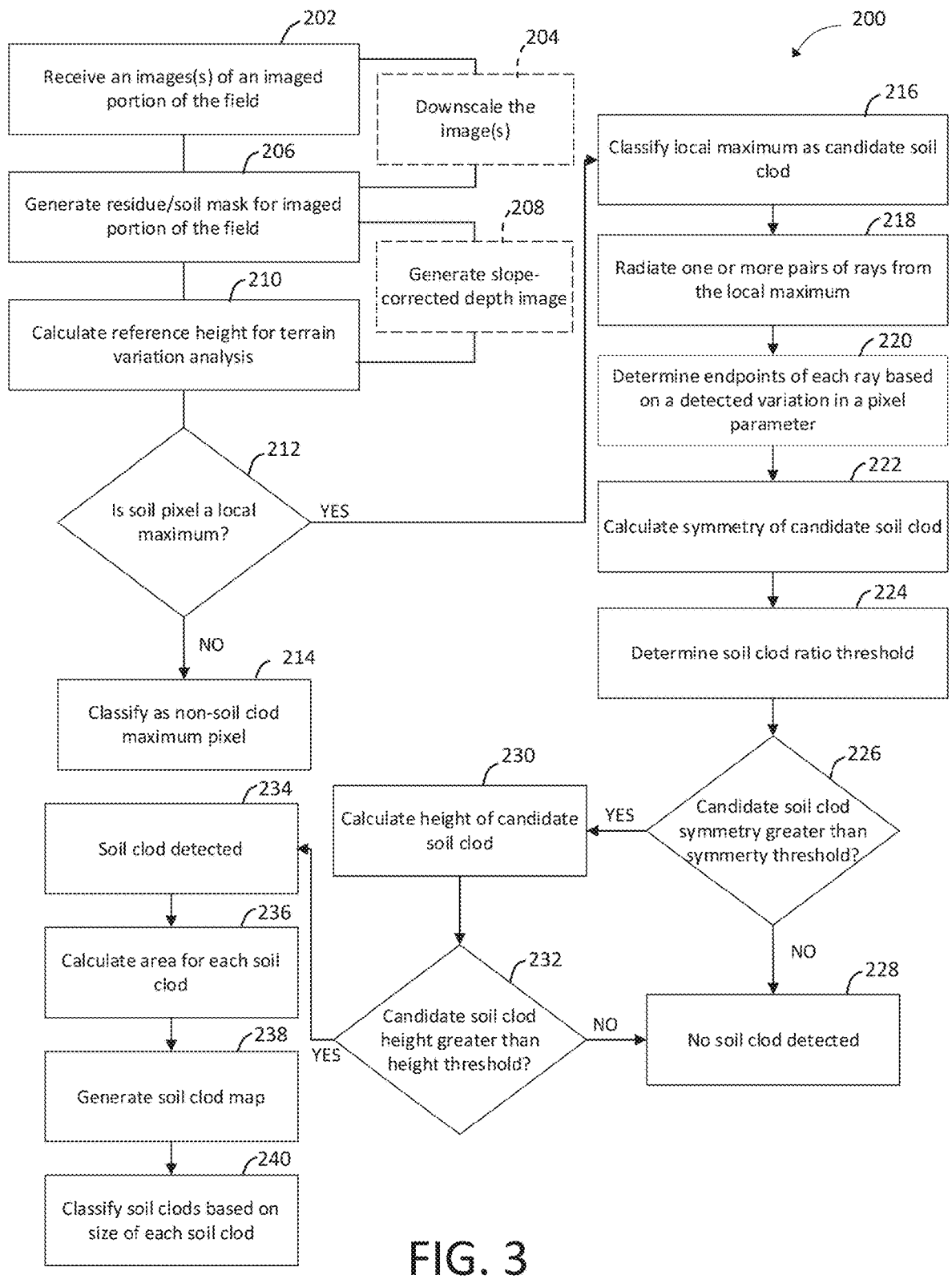
FIG. 3 illustrates a flow diagram providing example control logic for detecting soil clods within imaged portions of a field in accordance with aspects of the present subject matter.

Referring now to FIG. 3, a flow diagram of example control logic 200 that may be executed by the computing system 110 (or any other suitable computing system) for detecting soil clods within imaged portions of a field is illustrated in accordance with aspects of the present subject matter. Specifically, the control logic 200 shown in FIG. 3 is representative of steps of an image processing algorithm that can be executed to detect soil clods within imaged portions of a field with greater accuracy and without requiring substantial computing resources and/or processing time. Thus, in several embodiments, the control logic 200 may be advantageously utilized in association with a system installed on or forming part of an agricultural machine to allow for real-time detection of soil clods within a field as the machine is being traversed across the field during the performance of an agricultural operation. In various embodiments, the control logic 200 may provide sufficient accuracy while allowing the vehicle to maintain a sufficient speed (e.g. greater than three miles per hour). In other embodiments, the control logic 200 may be used in association with any other suitable system, application, and/or the like for detecting soil clods within a field.

As shown in FIG. 3, at (202), the control logic 200 includes receiving images of the imaged portion of the field. For example, as indicated above, the computing system 110 (FIG. 2) may be communicatively coupled to the imaging device(s) 104 (FIG. 2), thereby allowing images captured by the imaging device(s) to be transmitted to and received by the computing system 110. In several embodiments, the image(s) received of each imaged portion of the field may correspond to a depth image(s) providing depth or height information at each pixel location. For instance, when the imaging device(s) 104 comprises a stereo camera assembly, the imaging device(s) 104 may be configured to pre-process the images captured by each camera 106, 108 (FIG. 2) to form a depth image of the imaged portion of the field, which can then be transmitted to the computing system 110. Alternatively, the imaging device(s) 104 may be configured to transmit the individual images captured by each camera 106, 108 to the computing system 110, in which case the computing system 110 may be configured to combine, compare, and/or otherwise process the images to generate the depth image. Regardless, the depth image may generally provide a pixel height value for each pixel within the image being analyzed, which can then be used by the computing system 110 to detect the presence of soil clods within the imaged portion of the field.

In several embodiments, the computing system 110 may be configured to smooth or otherwise filter the image. Single-instruction, multiple-data (SIMD) and other parallel processing techniques may be used to process the image data. The image convolution can be based on singular value decomposition (SVD) of a non-separable smoothing or other kernel.

Referring further to FIG. 3, at (204), the control logic 200 may also include downscaling the depth image. The downscaling of the depth image may be accomplished through a downscaling algorithm that limits the spectral bandwidth of the input high resolution image by applying a low-pass filter, subsampling, and reconstructing the result. The downscaling of the depth image may allow for detection of macroscopic (e.g., low-resolution) changes in the depth image.

Figure 4:
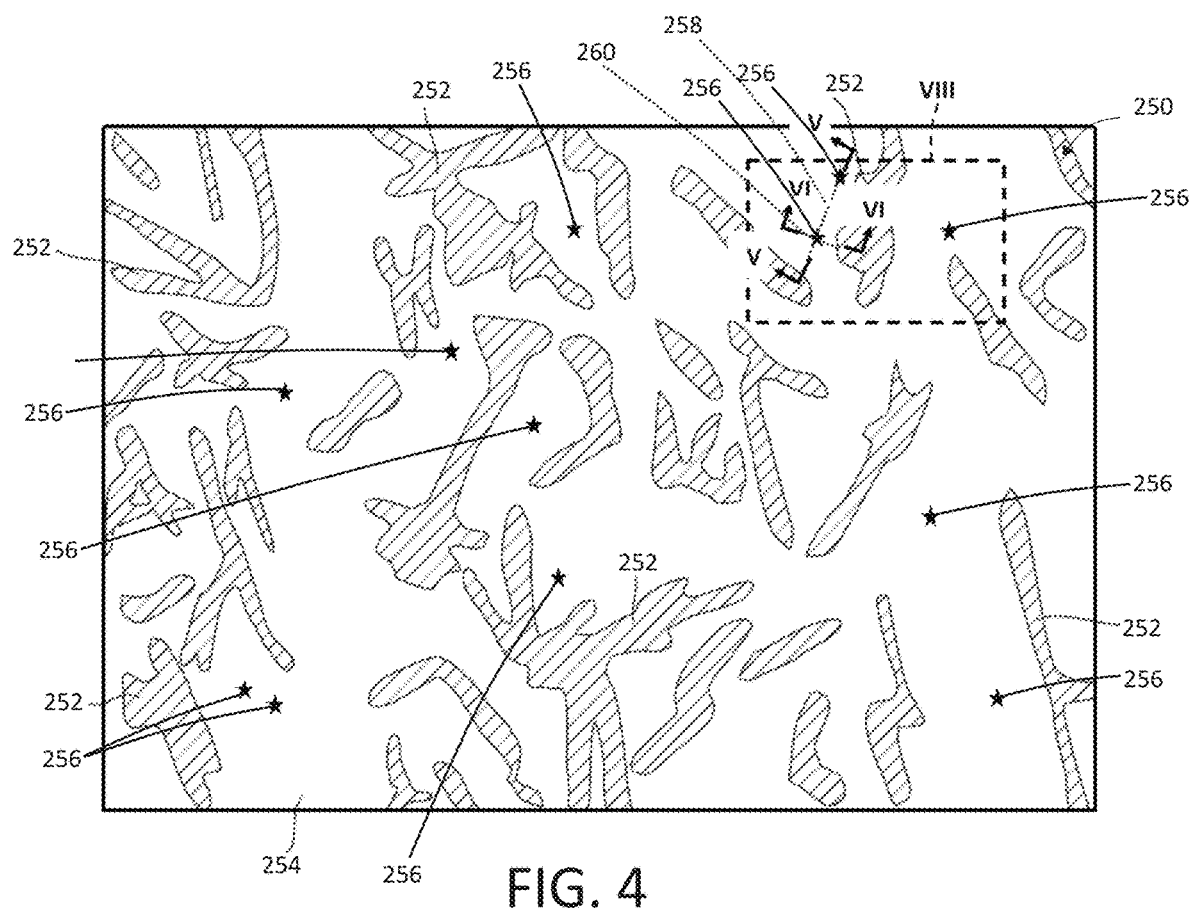
FIG. 4 illustrates an example residue mask that identifies "residue pixels" (as opposed to "soil pixels") within an image of a field in accordance with aspects of the present subject matter.

At (206), the control logic 200 includes generating a residue/soil mask associated with the imaged portion of the field. Specifically, the computing system 110 may be configured to analyze the image(s) of the imaged portion of the field using one or more image processing algorithms to distinguish soil from crop residue within the image(s), thereby allowing the computing system 110 to classify each pixel within the image(s) as a soil pixel or a residue pixel. For instance, FIG. 4 illustrates an example residue/soil mask 250 associated with an imaged portion of a field in which the residue pixels are shaded to indicate the crop residue 252 within the field and the soil pixels are unshaded to indicate soil 254 within the field.

It will be appreciated that the computing system 110 may be configured to utilize any suitable image processing algorithm(s) to distinguish soil from crop residue (or any other object) within each image being processed. For instance, in some embodiments, a texture-based algorithm may be utilized that relies on the orientations of image gradients to differentiate residue pixels from soil pixels. Specifically, residue regions are typically characterized by a high number of gradients in the same direction due to the straightness of the residue pieces, whereas soil gradients are more randomly oriented. Thus, by identifying the gradient orientations within the images, the pixels can be analyzed and classified as residue/soil pixels. In other embodiments, a color-based algorithm may be utilized that relies on color differences to differentiate between residue and soil pixels. In further embodiments, when the imaging device(s) 104 is capable of capturing the distinction between the reflective characteristics of the soil/residue, an algorithm may be used that identifies the differences in the reflectivity or spectral absorption between the soil and the crop residue contained within each image.

Referring back to FIG. 3, at (208), the control logic 200 may also include generating a slope-corrected depth image. Specifically, in some embodiments, the depth or height information associated with the depth image received from the imaging device(s) 104 (or generated based on the images received from the imaging device(s) 104) may be corrected or adjusted based on an estimated slope of the imaged portion of the field. An example algorithm or control logic for generating a slope-corrected depth image will be described below with reference to FIG. 11.

It will be appreciated that any of the steps described herein (e.g., with reference to control logic 200, control logic 300, and/or method 400) may be performed using the original depth image received from (or deriving from images transmitted by) the imaging device(s) 104, using the slope-corrected depth image (e.g., as calculated at (208)), and/or using the downscaled depth image (e.g., as generated at (204)).

At (210), the control logic 200 includes calculating a reference plane or nominal height of the soil surface to be used for analyzing the soil pixels contained within a given image to determine whether any soil clods are present within the imaged portion of the field. Such calculation may be performed using the original depth image received from (or deriving from images transmitted by) the imaging device(s) 104 or using the slope-corrected depth image (e.g., as calculated at (208)).

In several embodiments, the reference height may correspond to an estimated "nominal soil height" of the soil surface. To estimate the nominal soil height, the computing system 110 may, in some embodiments, be configured to determine an estimated soil height of the soil contained within the imaged portion of the field. For instance, in some embodiments, the computing system 110 may be configured to estimate the nominal soil height by calculating an average height of the soil pixels within the image. For instance, as indicated above, each pixel within the depth image may be associated with a pixel height. Thus, by averaging the pixel heights associated with the previously classified or identified soil pixels, an average soil height may be calculated. In some embodiments, the average pixel height may be subtracted from the depth image to determine the nominal height of the soil surface. It will be appreciated that the computing system 110 may be configured to determine the nominal soil height contained within the imaged portion of the field using any other suitable methodology without departing from the scope of the present disclosure. Referring still to FIG. 3, at (212), the control logic 200 includes determining whether the pixel height of each soil pixel contained within the image is a local maximum. Specifically, in several embodiments, the computing system 110 may be configured to compare the pixel height associated with each previously identified soil pixel to adjacently positioned soil pixels. If the pixel height associated with a given soil pixel is less than or equal to a predefined quantity of pixels that surround the given soil pixel, the computing system 110 may be configured to classify (e.g., at 214) such soil pixel as a "non-soil clod" pixel. However, if the pixel height associated with a given soil pixel is greater than the predefined quantity of pixels that surround the given soil pixel, the computing system 110 may be configured to classify (e.g., at 216) such soil pixel as a "candidate soil clod" pixel. For instance, FIG. 4 illustrates a plurality of local maximum 256 associated with an imaged portion of a field in which the local maximum 256 within the soil pixels are starred to indicate each local maximum 256 within the field. Thus, the computing system 110 may be configured to analyze the soil pixels contained within the image in view of the adjacently positioned pixels and classify each pixel as either a "non-soil clod" pixel or a "candidate soil clod" pixel. As will be described below, the candidate soil clod pixels may then be analyzed to determine whether such pixels are in fact associated with a soil clod within the imaged portion of the field.

Referring back to FIG. 3, at (218), the control logic 200 includes radiating one or more pairs of rays from each local maximum to an estimated outer edge of the candidate soil clod. As provided herein, radiating one or more pairs of arrays can include sequentially checking the height/depth of pixels along each linear ray, beginning with those pixels immediately adjacent to the maximum and continuing until a clod edge condition is detected. For instance, FIG. 4 illustrates a first ray 258 and a second ray 260 each extending from local maximum 256 within the soil pixels of the field. In some embodiments, the computing system 110 may be configured to analyze the image(s) of the imaged portion of the field using one or more image processing algorithms to detect edge conditions, which may be indicative of an outer edge of the candidate soil clod. For example, the edge condition may be one or more of a location in which a non-soil pixel is reached, a location in which the first ray 258 or the second ray 260 reaches a void in the depth image (i.e., a pixel for which a depth has not been calculated), and/or a location in which an inflection point is detected based on the pixel height for each respective pixel within the soil pixels (i.e., a position in which a gradient stops getting steeper and starts getting shallower and/or a position in which a gradient increases in height of adjacent soil pixels).

In various embodiments, the first ray 258 is generated by extending candidate first rays through the local maximum 256 in a plurality of directions that are rotationally offset from one another. For example, the candidate rays may extend through the local maximum in an x direction, a y direction, and each 45-degree diagonal direction of the depth image. Since the pixels, in some embodiments, lie in a square array, extending four arrays in the predefined direction may reduce processing time when compared to extending candidate rays in arbitrary directions.

Figure 5:
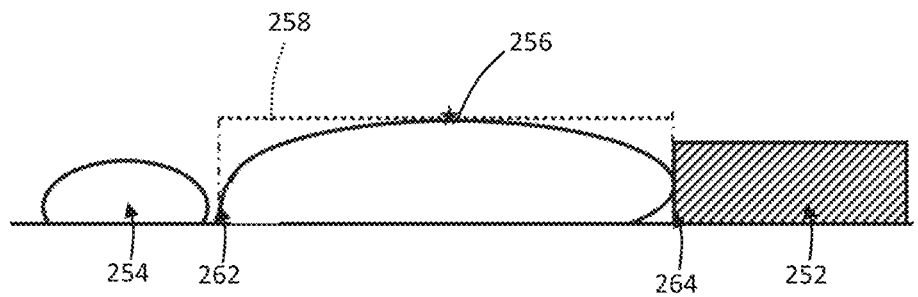
FIG. 5 is an example cross-sectional of a portion of the field within the imaged portion of the field taken along the line V-V of FIG. 4.

Each of the candidate first rays extend in a generally linear direction until the candidate first ray reaches opposing endpoints that are determined based on a detected edge condition. For instance, with reference to FIG. 5, a first endpoint 262 of the candidate first ray is determined by an inflection point being detected, which may be caused by an adjacent soil clod and/or any other terrain irregularity. In the illustrated embodiment of FIG. 5, a second endpoint 264 of the candidate first ray is determined by the candidate first ray reaching a residue pixel. As such, the length of the candidate first ray is determined to be the length between the first and second endpoints 262, 264 of each respective first ray 258. In various embodiments, the candidate first ray may extend through the local maximum 256 in at least four directions each rotatably offset from one another by 45 degrees, at least six directions each rotatably offset from one another by 30 degrees, at least eight directions each rotatably offset from one another by 22.5 degrees, and/or any other number of directions that are rotatably offset from one another. Each of the lengths of the candidate first rays are calculated and the first ray 258 is determined to be the longest of the candidate first rays.

Figure 6:
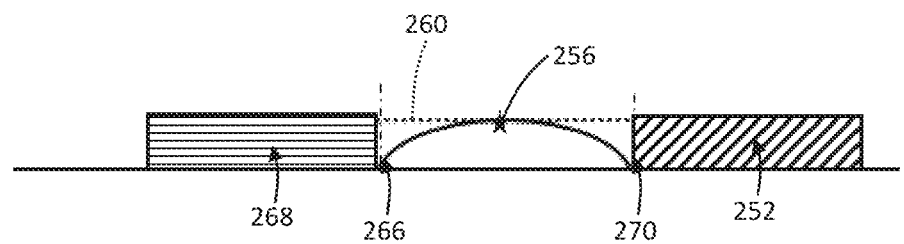
FIG. 6 is an example cross-sectional of a portion of the field within the imaged portion of the field taken along the line VI-VI of FIG. 4.

With reference to FIGS. 4 and 6, once the first ray 258 is determined from the candidate of first rays, the second ray 260 may extend through the local maximum 256 in a second direction, which may be perpendicular to the first direction. As illustrated in FIG. 6, a first endpoint 266 of the second ray 260 is determined by a void 268 in the depth image. In the illustrated embodiment of FIG. 6, a second endpoint 270 of the second ray 260 is determined by the second ray 260 reaching a residue pixel 252. As such, the length of the second ray 260 is determined to be the length between the first and second endpoints 266, 270 of the second ray 260.

Figure 7:
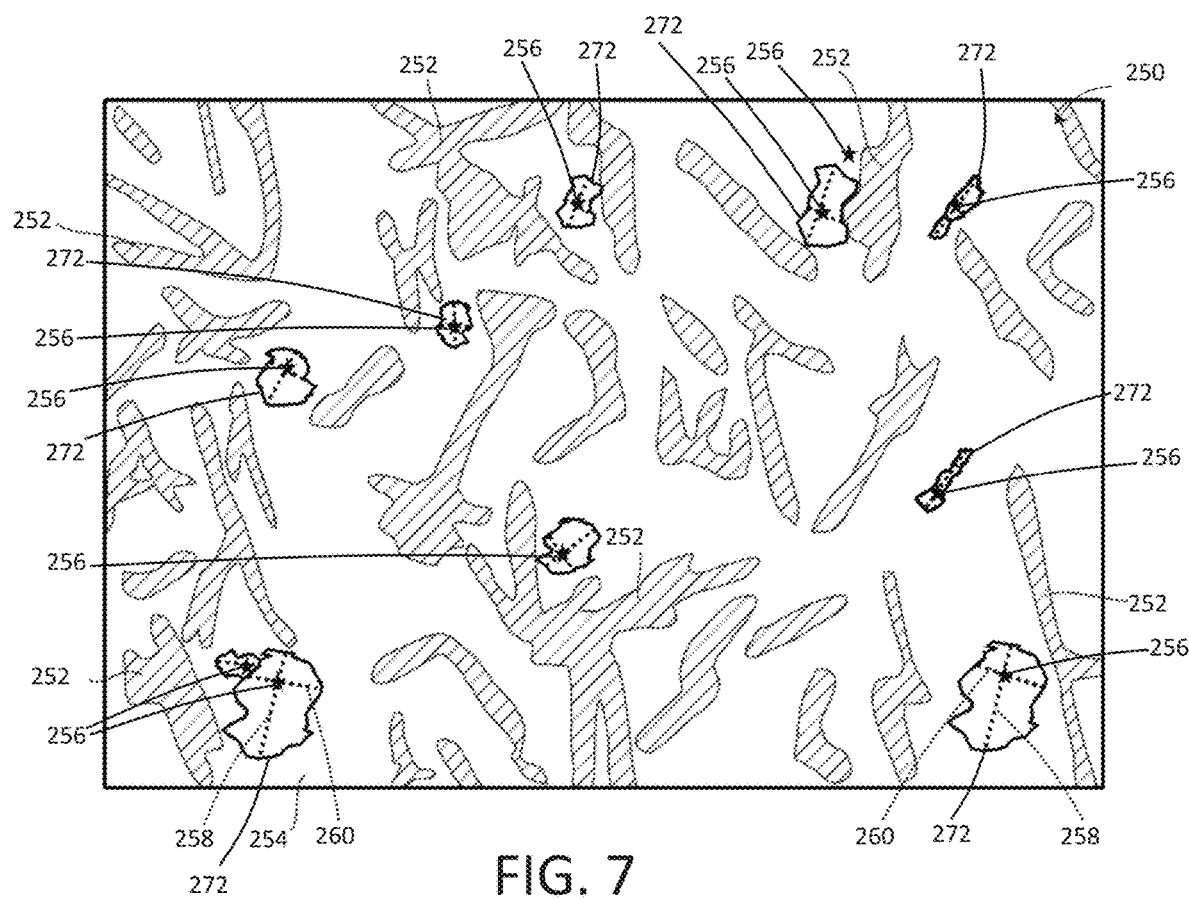
FIG. 7 illustrates the example residue mask of FIG. 4 further identifying variations in an edge condition that surround local maxima within the "soil pixels;"

FIG. 7 illustrates an edge condition 272 surrounding a local maximum 256 superimposed or overlaid onto the residue/soil mask 250. It will be appreciated that the computing system 110 may be configured to utilize any suitable image processing algorithm(s) to distinguish edge conditions within each image being processed. For instance, in some embodiments, a texture-based algorithm may be utilized that relies on the orientations of image gradients to differentiate the parameters of each pixel. In other embodiments, a color-based algorithm may be utilized that relies on color differences to differentiate between residue and soil pixels. In further embodiments, when the imaging device(s) 104 is capable of capturing the distinction between the reflective characteristics of the soil/residue, an algorithm may be used that identifies the differences in the reflectivity or spectral absorption between the various pixels contained within each image.

Referring back to FIG. 3, at (222), the control logic 200 includes calculating a symmetry of the candidate soil clod based on a length of the first ray and a length of the second ray. For instance, in some embodiments, the computing system 110 may be configured to calculate a soil clod ratio of the first ray relative to the second ray. As provided herein, the length of candidate first rays may be compared to one another and the first ray is determined to be the longest of the candidate first rays. Once the first ray is determined from the candidate of first rays, a second ray may be determined from the local maximum in a second direction that is offset (or perpendicular) to the first ray until opposing endpoints are determined based on a detected edge condition. As such, in some embodiments, the first ray length may be greater than the second ray length.

Figure 8:
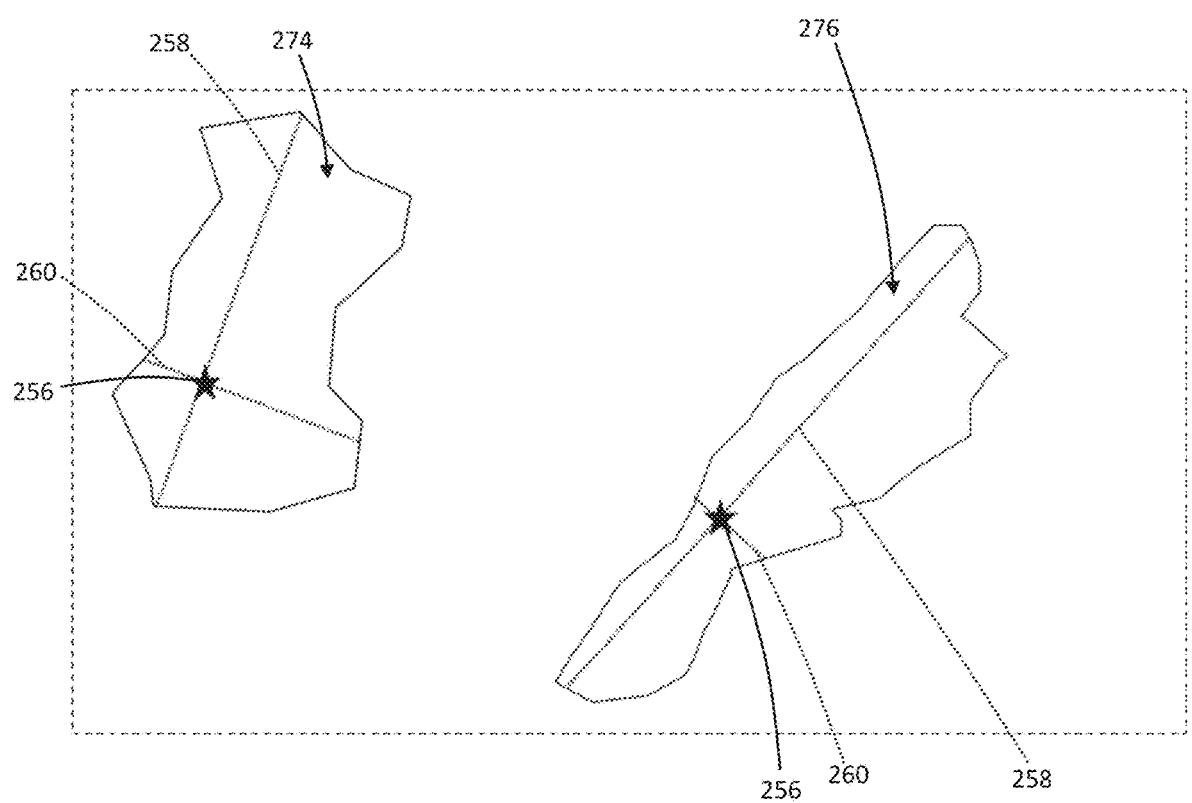
FIG. 8 illustrates an enhanced view of area VIII of FIG. 4.

The soil clod ratio may be used to determine whether the candidate soil clod has a geometry that is indicative of a soil clod versus a geometry of another object, such as a foreign object within the field, a stalk, a terrain irregularity (e.g., a ridge, a valley, or the like), etc. For instance, as illustrated in FIG. 8, a first candidate clod 274 has a first soil clod ratio based on a length of a first ray 258 of the first candidate clod 274 to a second ray 260 of the first candidate clod 274. Likewise, a second candidate clod 276 has a second soil clod ratio based on a length of a first ray 258 of the second candidate clod 276 to a second ray 260 of the second candidate clod 276. In the illustrated embodiment, the second soil clod ratio is greater than the first soil clod ratio. In some examples, the second soil clod ratio may be too large to be deemed a candidate soil clod (e.g., object is likely an object other than a soil clod) while the first soil clod ratio may be deemed a candidate soil clod.

Referring back to FIG. 3, at (224), the control logic 200 includes determining a soil clod ratio threshold. For instance, the soil clod ratio may correspond to a fixed ratio or may be selected or determined based on the current soil conditions within the field. For instance, in some embodiments, the soil clod ratio threshold may correspond to an operator-selected value based on observed conditions or a value that is calculated based on sensed surface conditions associated with the residue within the field.

At (226), the control logic 200 includes determining whether the soil clod ratio of each candidate soil clod contained within the image exceeds the soil clod ratio threshold (e.g., as determined at (224)). Specifically, in several embodiments, the computing system 110 may be configured to compare the soil clod ratio associated with each previously identified candidate soil clod to the soil clod ratio threshold. If the soil clod ratio associated with a given candidate soil clod is greater than or equal to the soil clod ratio threshold, the computing system 110 may be configured to classify (e.g., at 228) such candidate soil clod as a "not a soil clod." However, if the soil clod ratio associated with a given candidate soil clod is less than the soil clod ratio threshold, the computing system 110 may be configured to continue classifying the candidate soil clod as such. Thus, the computing system 110 may be configured to analyze the candidate soil clods contained within the image in view of the soil clod ratio threshold and segregate a portion of candidate soil clods from non-soil clods based on the geometric shape of each respective candidate soil clod.

At (230), the control logic 200 includes calculating a height (e.g., prominence) of each of the candidate soil clods (or simply "candidate soil clod height") having a soil clod ratio that is less than or equal to soil clod ratio threshold (e.g., as determined at (226)). In several embodiments, the candidate soil clod height may correspond to an estimated height of the candidate soil clod extending above the soil surface. The computing system 110 may, in some embodiments, be configured to determine a candidate soil clod height based on an average pixel of one or more of the largest height changes across both the first ray and/or the second ray. For instance, in some embodiments, the largest four height changes along the first ray and/or the second ray may be averaged to determine a candidate soil clod height of each candidate soil clod.

At (232), the control logic 200 includes determining whether the candidate soil clod height associated with each candidate soil clod contained within the image exceeds a height threshold. Specifically, in several embodiments, the computing system 110 may be configured to compare the candidate soil clod height associated with each previously identified candidate soil clod to the corresponding height threshold. If the candidate soil clod height associated with the previously identified candidate soil clod is less than or equal to the height threshold, the computing system 110 may be configured to classify (e.g., at 228) such candidate soil clod as a "not a soil clod." However, if the candidate soil clod height associated with a given candidate soil clod is greater than the height threshold, the computing system 110 may be configured to classify (e.g., at 234) such candidate soil clod as a detected soil clod. Thus, the computing system 110 may be configured to analyze the candidate soil clods contained within the image in view of the height threshold and classify each candidate soil clod as either "not a soil clod" or a "soil clod." It will be appreciated that, in some embodiments, a threshold can be applied to a ratio of the clod height and clod area, rather than the clod height. As such, candidate clods covering a smaller area may have a smaller height and still be classified as clods.

At (236), the control logic 200 includes determining an area associated with each detected soil clod. Specifically, the computing system 110 may be configured to determine the soil clod area associated with the previously identified soil clod based on the first ray and/or the second ray of each soil clod. In various embodiments, the control logic 200 may perform one or more of steps (212) through (236) for a single copy or a plurality of copies of the depth image. In embodiments in which the control logic 200 performs one or more of steps 212-236 for a plurality of copies of the depth image, each of the plurality of copies of the depth image may be downscaled by a different amount. For example, a first depth image of the plurality of copies may be downscaled by a factor of 1, a second depth image of the plurality of copies may be downscaled by a factor of 2, a third depth image of the plurality of copies may be downscaled by a factor of 4, and a fourth depth image of the plurality of copies may be downscaled by a factor of 8. It will be appreciated that the plurality of copies of the depth image may include any number of images that are downscaled by any factor without departing from the scope of the present disclosure.

In some embodiments, the computing system 110 may be configured to generate a boundary of the detected soil clods that intersects each of the first and second endpoints of the first ray and the first and second endpoints of the second ray. In some embodiments, the boundary may be rectilinear, ellipsoidal, or any other geometric shape. In several embodiments, the computing system 110 may be configured to analyze the boundary of each soil clod to calculate the soil clod area of each soil clod. In some instances, the computing system 110 may be configured to calculate an area of the soil pixels within each soil clod boundary to determine a soil clod area. It will be appreciated that the computing system 110 may be configured to utilize any suitable image processing algorithm(s) to generate a boundary for each respective soil clod.

At (238), the control logic 200 includes generating a soil clod map of the detected soil clods (e.g., as identified at (234)). In several embodiments, each of the clods calculated across each of the plurality of copies of the depth image are combined into a single list that is ordered by size. To ensure the correct areas of the clods are calculated after downscaling, the calculated areas may be multiplied by the square of the downscaling factor for each of the plurality of copies of the depth image.

Figure 9:
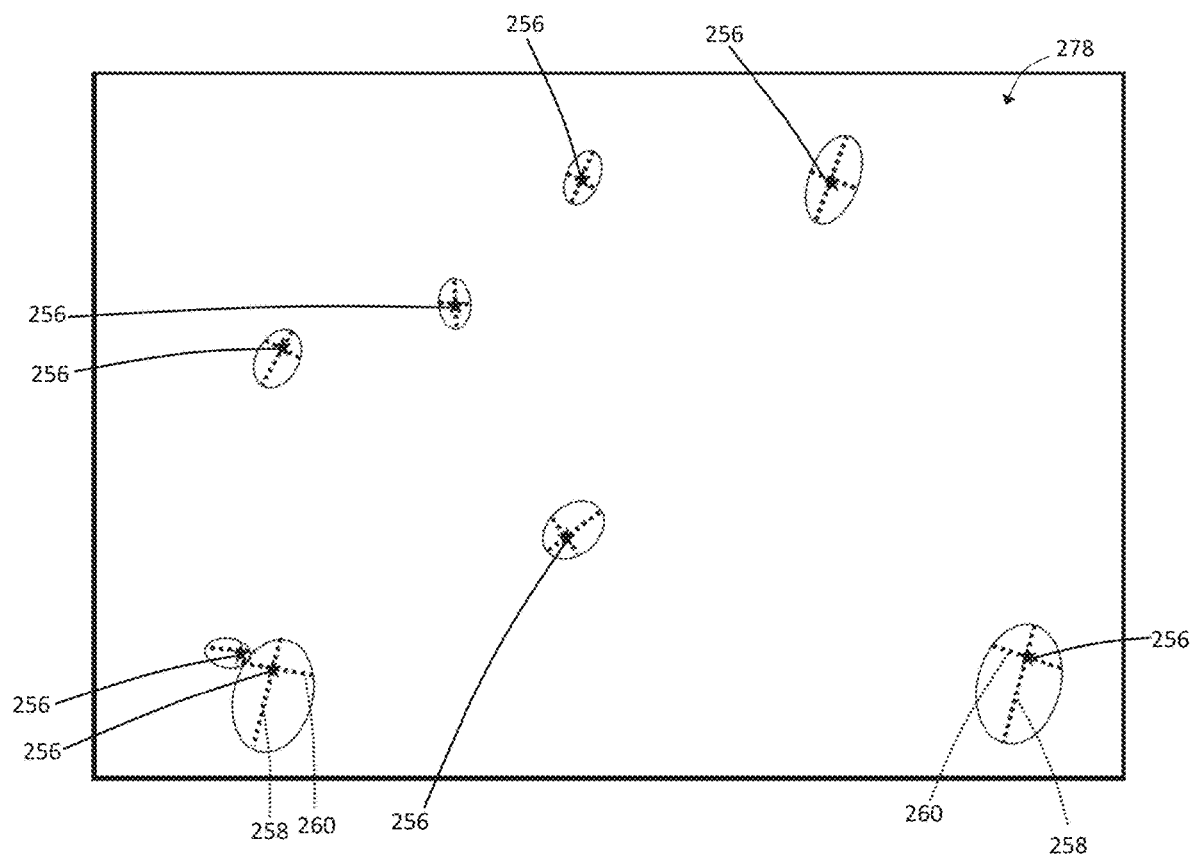
FIG. 9 illustrates an example soil clod map in accordance with aspects of the present subject matter.

In general, the soil clod map may have dimensions that correspond to the imaged portion of the field. For instance, FIG. 9 illustrates a soil clod map 278 having the same dimensions of the imaged portion of the field of FIG. 4. Based on the detected local maxima 256 of FIG. 4 and the first and second rays 258, 260 of each detected soil clod, each detected soil clod is positioned within the soil clod map 278 in a position that correlates to its position in the imaged portion of the field.

In some embodiments, each of the detected soil clods are added to the soil clod map 278 based on the size of each soil clod. For example, in various embodiments, the soil clods may be added to the soil clod map 278 with the largest soil clod, by area, first ray length, second ray length, or any other measurement, being added first. Next, prior to each subsequent soil clod being added to the soil clod map 278, a percent overlap with previously accepted clod may be calculated. In some instances, only soil clods with the overlap below an overlap threshold are accepted and added to the soil clod map 278. In other embodiments, each of the detected soil clods may be added to the soil clod map 278. Moreover, it will be appreciated that each of the detected soil clods may be added to the soil clod map 278 in any order without departing from the scope of the present disclosure.

Figure 10:
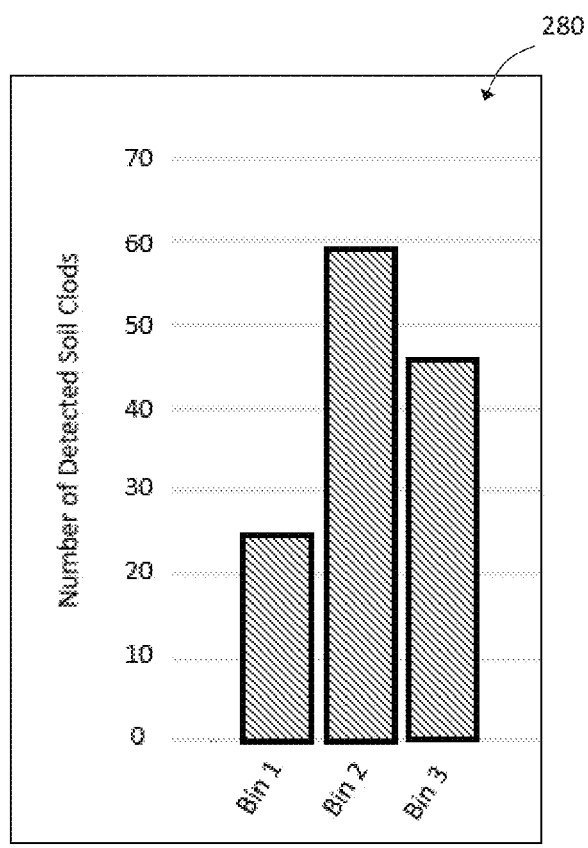
FIG. 10 illustrates an example bar graph of the soil clods detected within the imaged portion of the field in accordance with aspects of the present subject matter.

Referring back to FIG. 3, at (240), the control logic 200 includes classifying each of soil clods based on an area of each soil clod. In general, classification of the area of each soil clod may include placing each of the detected soil clods in various bins based on the area of each soil clod, the volume of each soil clod (e.g., using the depth values), and/or any other metric. For example, FIG. 10 illustrates a sample graph 280 of the detected soil clods within the imaged portion of the field classified based on size once each detected soil clod has been counted. For example, "Bin 1" may include soil clods of a first size range, "Bin 2" may include soil clods of a second size range that is greater than the first size range, and "Bin 3" may include soil clods of a third size range that is greater than the second size range. In some embodiments, the first size range, the second size range, and/or the third size range may correspond to operator-selected ranges based on observed conditions or a range that is calculated based on sensed surface conditions associated with the soil within the field. It will be appreciated that any number of bins/size ranges may be used without departing from the scope of the present disclosure. It will be appreciated that, upon detection of a soil clod meeting a predefined characteristic (e.g., a predefined size, shape, etc.) and/or a change in the number of soil clods meeting various characteristics, the computing system 110 may be configured to perform any number of follow-up actions, including storing data associated with the detected soil clod(s) within its memory 114 and/or transmitting such data to a separate computing device (e.g., a remote server and/or a computing device associated with a corresponding agricultural machine, such as a vehicle controller). Such actions may also include generating a notification for display to an operator (e.g., via the associated user interface 130) that provides information associated with the detection of the soil clod exceeding a predefined characteristic (e.g., a predefined size, shape, etc.) and/or a change in the number of soil clods exceeding various characteristics. For example, in some embodiments, if a detected soil clod does not exceed a first threshold based on a predefined characteristic (e.g., a predefined size, shape, etc.), the user interface 130 may overlay a first pattern/color (e.g., green) onto the location of the clod within the soil clod map 278 and/or display as such within any other graphic presented on the user interface 130. If a detected soil clod does exceed a first threshold but fails to exceed a second threshold based on a predefined characteristic (e.g., a predefined size, shape, etc.), the user interface 130 may overlay a second pattern/color (e.g., yellow) onto the location of the clod within the soil clod map 278 and/or display as such within any other graphic presented on the user interface 130. If a detected soil clod does exceed the first threshold and the second threshold based on a predefined characteristic (e.g., a predefined size, shape, etc.), the user interface 130 may overlay a third pattern/color (e.g., red) onto the location of the clod within the soil clod map 278 and/or display as such within any other graphic presented on the user interface 130.

Additionally, as indicated above, the computing system 110 (or a separate computing system) may be configured to control the operation of an associated agricultural machine based on the detection of a soil clod meeting a predefined characteristic (e.g., a predefined size, shape, etc.) and/or a change in the number of soil clods meeting various characteristics. For instance, when the imaging device(s) 104 are installed on an agricultural machine, the present subject matter may allow for real-time detection of soil clods within a field as the machine traverses the field during the performance of an agricultural operation. In such an embodiment, adjustments of the operation of the agricultural machine may be made in real-time or on-the-fly in response to the detection of the soil clod meeting a predefined characteristic (e.g., a predefined size, shape, etc.) and/or a change in the number of soil clods meeting various characteristics. For example, when the agricultural machine includes a tillage implement configured to perform tillage operation within the field (e.g., the implement 14 shown in FIG. 1), real-time or on-the-fly adjustments may be made to the tillage parameters associated with the ground-engaging tools of the implement, such as by adjusting the penetration depth, down pressure/force, angle-of-attack, and/or the like of one or more of the ground-engaging tools.

Moreover, in embodiments in which the disclosed system is configured to capture both pre-tilled and post-tilled images of the field, the computing system 110 may be configured to compare and contrast the pre-tilled and post-tilled images to assess the effectiveness of a tillage implement in breaking-up or dispersing the soil clods. For instance, when a soil clod meeting a predefined characteristic (e.g., a predefined size, shape, etc.) and/or a change in the number of soil clods meeting various characteristics is detected in a pre-tilled image of a given imaged portion of the field, a corresponding post-tilled image of such portion of the field may also be captured to determine whether the soil clod meeting a predefined characteristic (e.g., a predefined size, shape, etc.) and/or a change in the number of soil clods meeting various characteristics still exist within the field. To the extent the soil clod meeting a predefined characteristic (e.g., a predefined size, shape, etc.) and/or a change in the number of soil clods meeting various characteristics is still present, the post-tilled soil clod meeting a predefined characteristic (e.g., a predefined size, shape, etc.) and/or a change in the number of soil clods meeting various characteristics can be compared to the pre-tilled soil clod meeting a predefined characteristic (e.g., a predefined size, shape, etc.) and/or a change in the number of soil clods meeting various characteristics to determine if the soil clod meeting a predefined characteristic (e.g., a predefined size, shape, etc.) and/or a change in the number of soil clods meeting various characteristics was reduced and, if so, to what extent.

Figure 11:
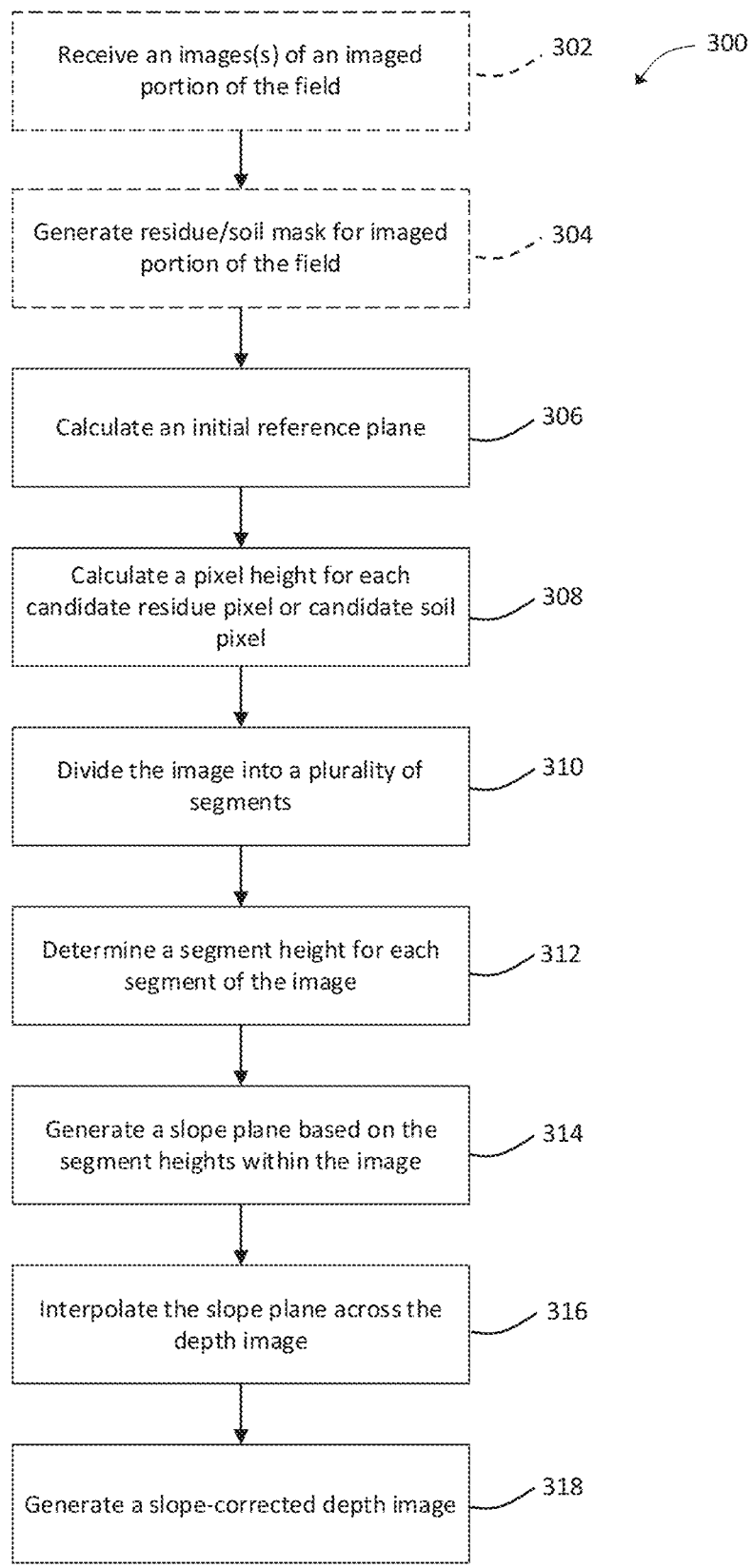
FIG. 11 illustrates a flow diagram providing example control logic for generating slope-corrected depth images in accordance with aspects of the present subject matter.

Referring now to FIG. 11, a flow diagram of example control logic 300 that may be executed for generating a slope-corrected depth image is illustrated in accordance with aspects of the present subject matter. As indicated above, a slope-corrected depth image may, in several embodiments, be used as an input within the control logic 200 described above with reference to FIG. 3. The control logic 300 shown in FIG. 11 is generally representative of steps of an image processing algorithm that can be executed to generate a slope-corrected depth image within imaged portions of a field with greater accuracy and without requiring substantial computing resources and/or processing time.

Figure 12:
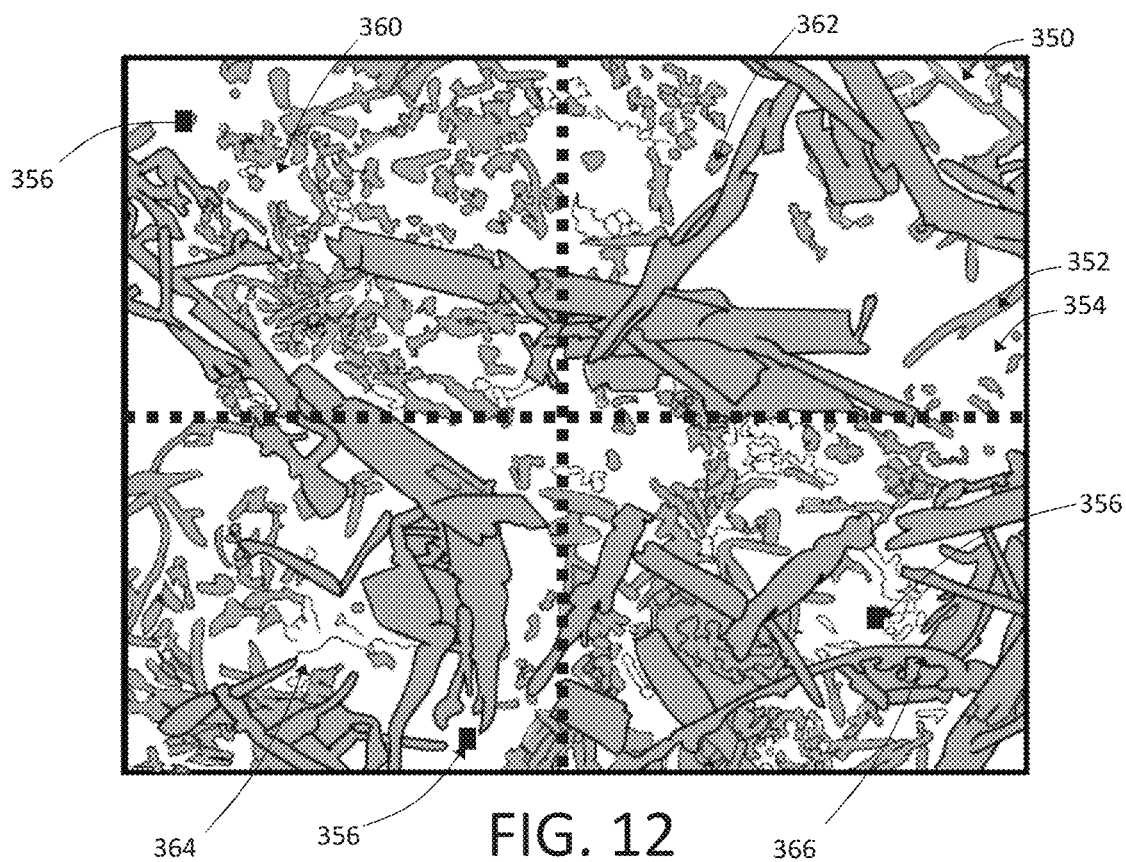
FIG. 12 illustrates an example of an image having a residue mask, a stem mask, and a soil mask with the image divided into four segments.

At (302) and (304), the control logic 300 includes receiving images of an imaged portion of the field and generating a residue/soil mask associated with the imaged portion of the field. As described above with reference to the control logic 200 shown in FIG. 3, the computing system 110 may be configured to analyze the image(s) received from the imaging device(s) 104 using one or more image processing algorithms to distinguish soil from crop residue within the image(s), thereby allowing the computing system 110 to classify each pixel within the image(s) as a soil pixel or a residue pixel. For instance, FIG. 12 illustrates another example residue mask 350 associated with an imaged portion of a field in which the residue pixels are shaded to indicate the crop residue 352 within the field, with the unshaded pixels (i.e., the soil pixels) being indicative of soil 354 within the field. It will be appreciated that additional masks can also be generated in the same manner. For example, the computing system 110 may also be capable of generating a foreign object mask (e.g., pixels not corresponding to residue or soil pixels), with the detected foreign objects being used or removed from any further steps within the algorithm.

Referring back to FIG. 11, at (306), the control logic 300 includes calculating an initial reference plane to be used for analyzing the pixels contained within a given image to determine whether any stem pixels (e.g., upright/near-vertical stems) are present within the imaged portion of the field. In several embodiments, the computing system 110 may be configured to estimate the initial reference plane by calculating an average height of the pixels within the image or a portion of the pixels within the image (e.g., by only using the residue pixels and/or the soil pixels). As indicated above, each pixel within the depth image may be associated with a pixel height. In some embodiments, pixels having a height that is above a predetermined threshold relative to the initial reference plane may be classified as stem pixels. For instance, FIG. 12 illustrates a stem mask 356 superimposed or overlaid onto the residue mask 350 in which the stem pixels are identified. It will be appreciated that the computing system 110 may be configured to determine the stem pixels contained within the imaged portion of the field using any other suitable methodology without departing from the scope of the present disclosure.

Additionally, at (308), the control logic 300 includes calculating a pixel height for each residue pixel or soil pixel. As indicated above, each pixel within the depth image may be associated with a pixel height. In several embodiments, the computing system 110 may use the height of each soil pixel as a ground height of that pixel. In various embodiments, the computing system 110 may determine the ground height of each residue pixel by subtracting a predefined residue carpet height value from the residue pixel height. The predefined residue carpet height value may correspond to a fixed value (e.g., three inches) or may be selected or determined based on the current residue conditions within the field. For instance, in some embodiments, the predefined residue carpet height may correspond to an operator-selected value based on observed conditions associated with the residue carpet or layer across the field. In other embodiments, the predefined residue carpet height may be calculated based on sensed surface conditions associated with the residue within the field.

Moreover, at step (310), the control logic 300 includes dividing the image into a plurality of segments to form a grid. Specifically, in several embodiments, the computing system 110 may be configured to split the image to a grid of segments. For example, as illustrated in FIG. 12, the image may be split into four segments 360, 362, 364, 366 each having a generally common number of image pixels. It will be appreciated that the image may be divided into any number of segments without departing from the scope of the present disclosure.

Referring back to FIG. 11, at step (312), the control logic 300 includes determining a segment height for each segment of the image. Specifically, in several embodiments, when a segment of the image includes at least a predefined percentage (e.g., 80 percent) of pixels that have a calculated ground height (e.g., pixels that have been classified as soil pixels or residue pixels (versus stem pixels)), the computing system 110 may be configured to calculate a segment height of that segment of the image.

In some embodiments, the computing system 110 may calculate a segment height by sorting the ground heights of each of the soil pixels and residue pixels, in combination, based on the ground heights of each pixel and using a predefined percentile (e.g., $5^{th}$ percentile) as the respective segment height. In other embodiments, the computing system 110 may calculate each segment height based on an average height of a percentage of the ground heights of each of the soil pixels and residue pixels within the segment of the image. In some instances, the percentage of ground heights of each of the soil pixels and residue pixels within the segment may be less than all of the ground heights of each of the soil pixels and residue pixels within the segment to remove outlying (noise) pixels from the dataset representing each respective segment of the image. For example, in some embodiments, the segment height may be calculated while removing the tallest five percent (or any other percentage) of soil pixels and/or residue pixels.

When a segment of the image includes less than the predefined percentage of pixels that have been classified as soil pixels or residue pixels (versus stem pixels), the computing system 110 may be configured to calculate a segment height of such segments as the mean of the remaining segments that include at least the predefined percentage of pixels that have been classified as soil pixels or residue pixels. In other embodiments, when a segment of the image includes less than the predefined percentage of pixels that have been classified as soil pixels or residue pixels, the segment height may be calculated based on an average of the surrounding segment heights, sensed surface conditions associated the field and/or a predefined height, such as a height of the initial reference plane (e.g., as calculated at (306)).

Figure 13:
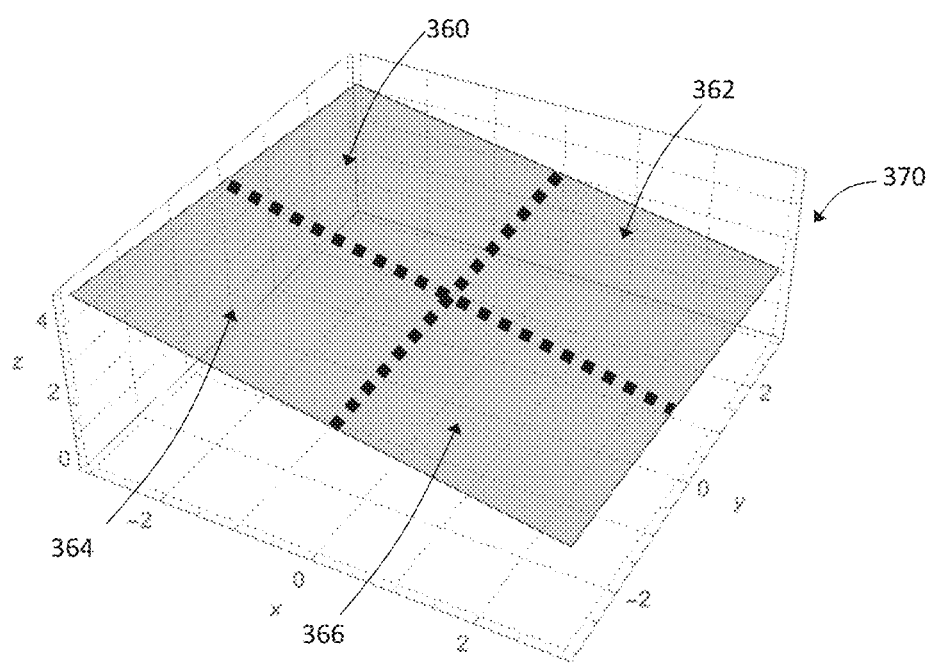
FIG. 13 illustrates a slope plane that is interpolated with a depth image of the field to generate a slope-corrected depth image.

At (314), the control logic 300 includes generating a slope plane based on the segment heights within the image. Specifically, the computing system 110 may be configured to use any practicable algorithm to determine a best fit slope plane. For example, the computing system 110 may be configured to use a least squares fit to fit a slope plane to the points calculated that form the grid (e.g., a 2×2 grid formed by the four segments 360, 362, 364, 366 of FIG. 13). In such instances, the least squares fit may be used to calculate an x-intercept, an x gradient, a y-intercept, and a y gradient. For instance, FIG. 13 illustrates an example slope plane associated with an imaged portion of a field based on the x-intercept, the x gradient, the y-intercept, and the y gradient. It will be appreciated, however, that any other method may be used for generating a slope plane based on the segment heights within the image without departing from the scope of the present disclosure.

Referring back to FIG. 11, at step (316), the control logic 300 includes interpolating the slope plane across the depth image. Specifically, the computing system 110 may be configured to renormalize the x and y gradient values by a ratio of the grid resolution and a depth image resolution (respectively for each of x and y dimensions). For instance, in embodiments that utilize the x-intercept, the x gradient, the y-intercept, and the y gradient to determine the slope plane, the computing system 110 may be configured to calculate, for each pixel in the depth image, a slope height from its pixel coordinates.

Moreover, at step (318), the control logic 300 includes generating a slope-corrected depth image by modifying the pixel height for each soil pixel and residue pixel in the image based on the offset from the slope plane at each pixel location (e.g., by subtracting or adding the offset to/from the pixel height for each soil/residue depending on whether the slope plane is above/below the reference plane at such pixel). By using the slope-corrected depth image, the computing system 110 may be able to detect one or more surface conditions of the field within the field with greater accuracy and without requiring substantial computing resources and/or processing time.

Figure 14:
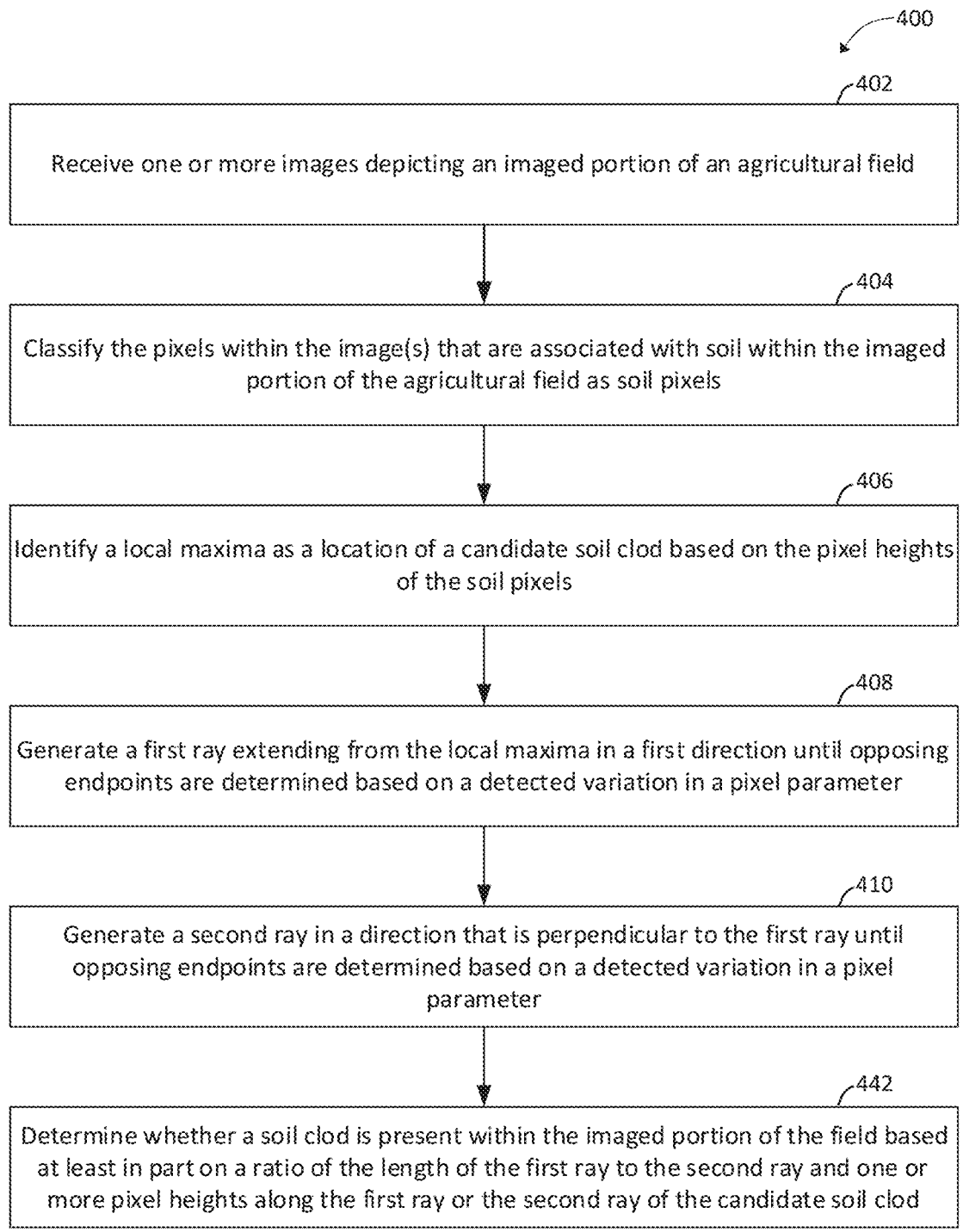
FIG. 14 illustrates a flow diagram of a method for detecting soil clods within a field in accordance with aspects of the present subject matter.

Referring now to FIG. 14, a flow diagram of a method 400 for detecting soil clods within a field is illustrated in accordance with aspects of the present subject matter. In general, the method 400 will be described herein with reference to the agricultural machine 10 shown in FIG. 1 and the various system components shown in FIG. 2. However, it will be appreciated that the disclosed method 400 may be implemented with agricultural machines having any other suitable machine configurations and/or within systems having any other suitable system configuration. In addition, although FIG. 14 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 14, at (402), the method 400 may include receiving one or more images depicting an imaged portion of an agricultural field. For instance, as described above, the computing system 110 may be communicatively coupled to the imaging device(s) 104, thereby allowing images captured by the imaging device(s) to be transmitted to and received by the computing system 110. Such images may, for example, include depth images or pairs of two-dimensional images that can be compared or otherwise processed to generate corresponding depth images.

Additionally, at (404), the method 400 may include classifying the pixels contained within the image(s) that are associated with soil within the imaged portion of the field as soil pixels. As indicated above, the computing system 110 may be configured to analyze the image(s) received from the imaging device(s) 104 to differentiate between crop residue and soil contained within the imaged portion of the field. For instance, as a result of the analysis, each pixel within the image(s) may be classified as a soil pixel or a residue pixel. Such a classification may allow for a residue mask (e.g., the mask 250 shown in FIG. 4) to be generated that identifies each soil pixel within the image(s).

At (406), the method 400 may include identifying a local maximum as a location of a candidate soil clod based on the pixel heights of the soil pixels. Specifically, in several embodiments, the computing system 110 may be configured to compare the pixel height associated with each previously identified soil pixel to adjacently positioned soil pixels to determine the local maximum.

At (408), the method 400 may include generating a first ray extending from the local maximum in a first direction until opposing endpoints are determined based on a detected edge condition. As described herein, the edge condition may be one or more of a location in which a non-soil pixel is reached, a location in which the first ray or the second ray reaches a void in the depth image, a location in which an inflection point is detected based on the pixel height for each respective pixel within the soil pixels, and/or any other detectable location within the image.

In various embodiments, the first ray is generated by extending candidate first rays from the local maximum in a plurality of directions that are rotationally offset from one another. For example, the candidate first rays may initially extend from the local maxima to each surrounding pixel. Next, the height/depth of each pixel along the ray may be sequentially checked until an edge condition has been satisfied. Each of the candidate first rays extend in a generally linear direction until the candidate first ray reaches opposing endpoints that are determined based on a detected edge condition. The length of each candidate first ray is determined to be the length between the first and second endpoints of the first ray. Each of the lengths of the candidate first rays are compared to one another and the first ray is determined to be the longest of the candidate first rays.

At (410), once the first ray is determined from the candidate of first rays, the method 400 may include generating a second ray from the local maximum in a second direction that is perpendicular to the first ray until opposing endpoints are determined based on a detected edge condition. Similarly to the first ray, the second ray extends through until the second ray reaches opposing endpoints that are determined based on a detected edge condition. As such, the length of the second ray is determined to be the length between the first and second endpoints of the second ray.

At (412), the method includes determining whether a soil clod is present within the imaged portion of the field based at least in part on a soil clod ratio of the length of the first ray to the second ray and/or one or more pixel heights along the first ray or the second ray of the candidate soil clod. For example, in several embodiments, the computing system 110 may be configured to compare the soil clod ratio associated with each previously identified candidate soil clod to the soil clod ratio threshold. If the soil clod ratio associated with a given candidate soil clod is greater than or equal to the soil clod ratio threshold, the computing system 110 may be configured to classify such candidate soil clod as a "not a soil clod." However, if the soil clod ratio associated with a given candidate soil clod is greater than the soil clod ratio threshold, the computing system 110 may be configured to continue classifying the candidate soil clod as such.

Further, in several embodiments, the computing system 110 may be configured to compare the candidate soil clod height associated with each previously identified candidate soil clod to a corresponding height threshold to determine a prominence of the soil clod. If the candidate soil clod height associated with the previously identified candidate soil clod is less than or equal to the height threshold, the computing system 110 may be configured to classify such candidate soil clod as a "not a soil clod." However, if the candidate soil clod height associated with a given candidate soil clod is greater than the height threshold, the computing system 110 may be configured to classify such candidate soil clod as a detected soil clod. Thus, the computing system 110 may be configured to analyze the candidate soil clods contained within the image in view of the height threshold and classify each candidate soil clod as either "not a soil clod" or a "soil clod." It will be appreciated that the computing system 110 may determine whether the candidate soil clod is of an appropriate ratio initially followed by determining a height of the candidate soil clod or vice versa without departing from the scope of the present disclosure.

It is to be understood that the steps of the control logic 200, 300 and method 400 are performed by a computing system (e.g., computing system 110) upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as the control logic 200, 300 and method 400, is implemented in software code or instructions which are tangibly stored on a tangible computer readable medium. The computing system loads the software code or instructions via a direct interface with the computer readable medium or via a wired and/or wireless network. Upon loading and executing such software code or instructions by the computing system, the computing system may perform any of the functionality of the computing system described herein, including any steps of the control logic 200, 300 and method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining soil clods within a field, the method comprising:
receiving, with a computing system, one or more images depicting an imaged portion of an agricultural field, the imaged portion of the field being at least partially represented by a plurality of pixels within the one or more images;
classifying, with the computing system, a portion of the plurality of pixels that are associated with soil within the imaged portion of the field as soil pixels, each soil pixel being associated with a respective pixel height;
identifying, with the computing system, a local maximum as a location of a candidate soil clod based on the pixel heights of the soil pixels;

generating, with the computing system, a first ray extending from the local maximum in a first direction until opposing endpoints are determined based on a detected edge condition;

generating, with the computing system, a second ray from the local maximum in a second direction that is perpendicular to the first ray until opposing endpoints are determined based on a detected edge condition; and determining, with the computing system, whether a soil clod is present within the imaged portion of the field based on a soil clod ratio of a length of the first ray to a length of the second ray or one or more pixel heights along the first ray or the second ray of the candidate soil clod.

2. The method of claim 1, wherein the one or more images comprise a depth image of the imaged portion of the agricultural field, each of the plurality of pixels within the depth image being associated with a respective pixel height.

3. The method of claim 2, further comprising:
generating, with the computing system, a slope-corrected depth image in which the depth image is corrected based on an estimated slope of the imaged portion of the field, the pixel height of each of the plurality of pixels deriving from the slope-corrected depth image.

4. The method of claim 2, wherein the detected edge condition is a location in which the first ray or the second ray reaches a void in the depth image.

5. The method of claim 2, wherein classifying the portion of the plurality of pixels that are associated with soil within the imaged portion of the field as soil pixels, identifying a local maximum as a location of a candidate soil clod based on the pixel heights of the soil pixels, generating the first ray extending from the local maximum, generating the second ray from the local maximum in a second direction that is perpendicular to the first ray, and determining whether the soil clod is present within the imaged portion of the field are completed for a plurality of copies of the depth image, with each of the plurality of copies of the depth image downscaled a different amount, and wherein each clod calculated across each of the plurality of copies of the depth image are combined into a single list, ordered by size.

6. The method of claim 1, wherein the detected edge condition is a location in which an inflection point is detected based on the pixel height for each respective pixel within the soil pixels.

7. The method of claim 1, wherein the detected edge condition is a location in which a non-soil pixel is reached.

8. The method of claim 1, wherein determining whether a soil clod is present within the imaged portion of the field based at least in part on a soil clod ratio of the length of the first ray to the second ray further comprises determining whether the soil clod ratio exceeds a soil clod ratio threshold.

9. The method of claim 1, further comprising: placing each of the soil clods in two or more bins based on an area of each soil clod.

10. The method of claim 1, further comprising:
generating a soil clod map of each of the soil clods within the imaged portion, wherein each of the soil clods is positioned within the soil clod map in a position that correlates to its position in the imaged portion of the field.

11. The method of claim 1, wherein receiving the one or more images comprises receiving the one or more images from an imaging device supported relative to an agricultural machine, the one or more images being captured by the imaging device as the agricultural machine travels across the field.

12. The method of claim 11, further comprising initiating, with the computing system, a control action associated with adjusting an operation of the agricultural machine based at least in part on the determination that a quantity of soil clods or a size of soil clods within the imaged portion of the field exceeds a predefined threshold.

13. A system for determining one or more soil clods within a field, the system comprising:
an imaging device configured to capture one or more images depicting an imaged portion of the field, the imaged portion of the field being at least partially represented by a plurality of pixels within the one or more images; and
a computing system communicatively coupled to the imaging device, the computing system including a processor and associated memory, the memory storing instructions that, when implemented by the processor, configure the computing system to:
receive the one or more images from the imaging devices;
classify a portion of the plurality of pixels that are associated with soil within the imaged portion of the field as soil pixels, each soil pixel being associated with a respective pixel height;
determine one or more local maximum based on the pixel heights of the soil pixels;
identify each of the one or more local maximum as a location of a candidate soil clod;
generate a first ray and a second ray extending in perpendicular directions from one another, with at least one of the first ray or the second ray intersecting the local maximum; and
determining whether the soil clod is present within the imaged portion of the field based on a soil clod ratio of a length of the first ray to a length of the second ray or one or more pixel heights along the first ray or the second ray of the candidate soil clod.

14. The system of claim 13, wherein the one or more images comprise a depth image of the imaged portion of the field, with each of the plurality of pixels within the depth image being associated with a respective pixel height.

15. The system of claim 14, wherein the computing system is further configured to determine an area of each soil clod based on the length of the first ray and the length of the second ray and determine a quantity of soil clods within the captured image having an area that is equal to or greater than a predefined threshold.

16. The system of claim 15, wherein the computing system is further configured to generate a map of each soil clod within the imaged portion based on the local maximum of each soil clod and the generated boundary of each soil clod.

17. A method for determining soil clods within a field, the method comprising:
receiving, with a computing system, one or more images depicting a first imaged portion of an agricultural field, the first imaged portion of the field being at least partially represented by a plurality of pixels within the one or more images;
classifying, with the computing system, a portion of the plurality of pixels that are associated with soil within the first imaged portion of the field as soil pixels, each soil pixel being associated with a respective pixel height;

generating a first ray and a second ray extending in perpendicular directions from one another from each local maximum within the soil pixels of the first imaged portion, with at least one of the first ray or the second ray intersecting the local maximum; and determining, with the computing system, whether a soil clod is present within the imaged portion of the field based at least in part on a soil clod ratio of a length of the first ray to a length of the second ray.

18. The method of claim 17, further comprising:

determining a quantity of soil clods in the first imaged portion of the field to a quantity of soil clods in a second imaged portion of the field.

19. The method of claim 17, wherein receiving the one or more images comprises receiving the one or more images from an imaging device supported relative to an agricultural machine, the one or more images being captured by the imaging device as the agricultural machine travels across the field, the method further comprising:

initiating a control action associated with adjusting an operation of the agricultural machine when the soil clod ratio exceeds a predefined threshold.

* * * * *